(12) United States Patent
Hattori et al.

(10) Patent No.: US 6,225,713 B1
(45) Date of Patent: May 1, 2001

(54) ELECTROMAGNETIC FORCE MOTOR AND METHOD OF MANUFACTURING THE SAME

(75) Inventors: Masakazu Hattori; Naohiro Makino, both of Gifu (JP)

(73) Assignee: Teijin Seiki Co., LTD, Tokyo (JP)

( * ) Notice: Subject to any disclaimer, the term of this patent is extended or adjusted under 35 U.S.C. 154(b) by 0 days.

(21) Appl. No.: 09/514,648

(22) Filed: Feb. 29, 2000

(30) Foreign Application Priority Data

Mar. 11, 1999 (JP) .................................................. 11-065677

(51) Int. Cl.$^7$ .................................................. H02K 33/00
(52) U.S. Cl. .............................................. 310/15; 310/119
(58) Field of Search ................................. 310/12, 15, 17, 310/191, 67 R; 29/596–598

(56) References Cited

U.S. PATENT DOCUMENTS

| | | | | |
|---|---|---|---|---|
| 3,441,819 | * | 4/1969 | Palmero ................................... | 310/15 |
| 3,777,236 | * | 12/1973 | Hrubes et al. ........................... | 310/27 |
| 3,858,135 | * | 12/1974 | Gray ....................................... | 335/266 |
| 3,891,874 | * | 6/1975 | Rotors et al. ........................... | 310/15 |
| 5,789,837 | * | 8/1998 | Shin et al. .............................. | 310/15 |

* cited by examiner

*Primary Examiner*—Tran Nguyen
(74) *Attorney, Agent, or Firm*—Venable; Richard L. Aitken

(57) ABSTRACT

An electromagnetic force motor comprising: a magnetic housing having a housing chamber formed therein; a stationary magnetic member received in the housing chamber in stationary relationship with respect to the magnetic housing; a movable magnetic member received in the housing chamber to be movable with respect to the stationary magnetic member, the stationary magnetic member, and the movable magnetic member forming with a magnetic flux gap to permit a magnetic flux to pass therethrough, the magnetic housing, the stationary magnetic member, and the movable magnetic member each made of a magnetic substance and collectively forming a magnetic circuit unit that is to allow a magnetic flux to pass therethrough; a permanent magnet positioned in the housing chamber and generating a magnetic flux; and an electromagnetic coil positioned in the housing chamber and generating a magnetic flux with an electric current imparted thereto, the magnetic circuit unit partly having a diminished cross-sectional area being small enough to ensure that the magnetic circuit unit is saturated with the magnetic flux as the movable magnetic member is positioned in the neighborhood of the first axial position of the movable magnetic member, the width of the magnetic flux gap being small enough to ensure that the strength of the magnetic attraction between the stationary magnetic member and the movable magnetic member increases in response to the increased density of the magnetic flux flowing between the magnetic surface of the stationary magnetic member and the magnetic surface of the movable magnetic member with an increase rate increasing as the movable magnetic member is positioned in the neighborhood of the first axial position of the movable magnetic member, the diminished cross-sectional area of the magnetic circuit unit and the width of the magnetic flux gap being each small enough to ensure that the strength of the magnetic attraction between the stationary magnetic member and the movable magnetic member substantially linearly increases in response to the increased level of the electric current imparted to the electromagnetic coil under the influence of each of the diminished cross-sectional area of the magnetic circuit unit and the width of the magnetic flux gap as the movable magnetic member is positioned in the neighborhood of the first axial position of the movable magnetic member.

20 Claims, 18 Drawing Sheets

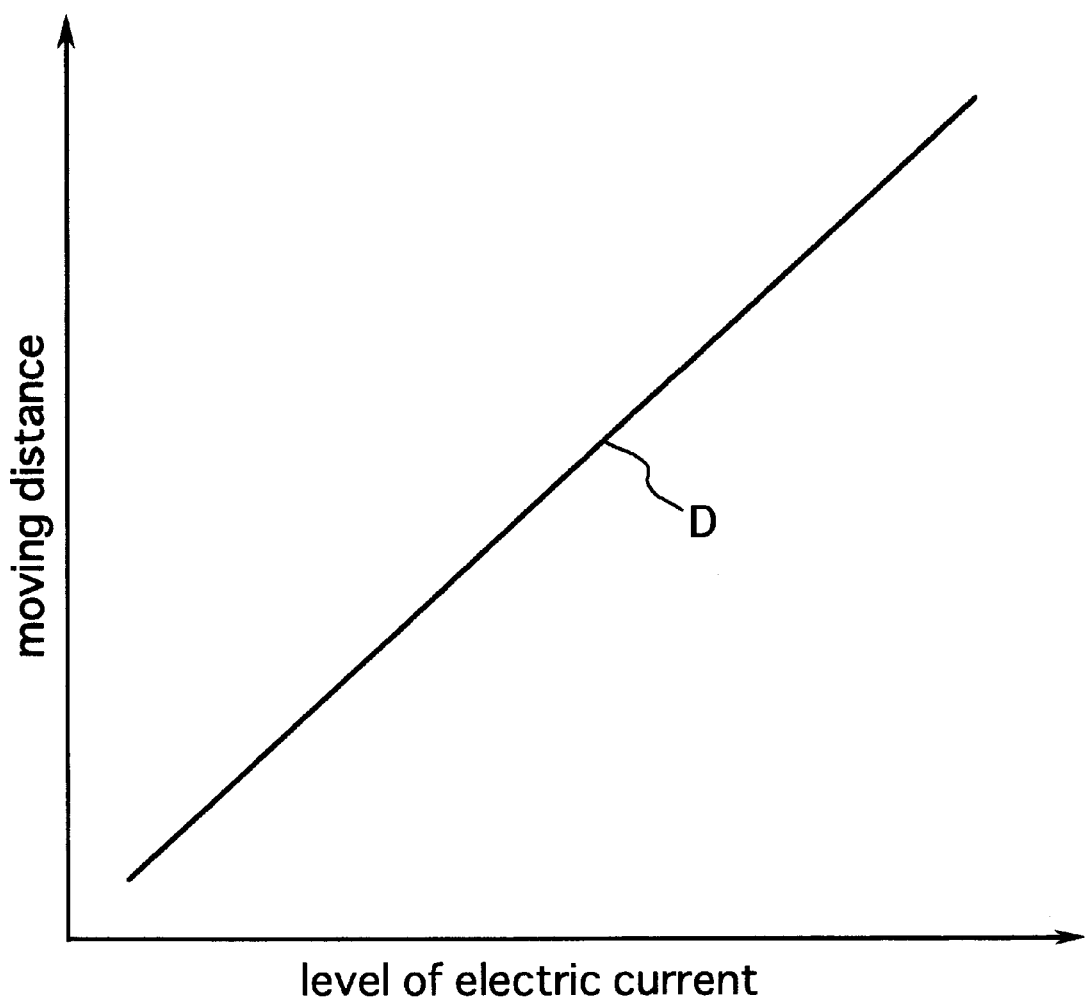
F I G. 6

F I G. 7
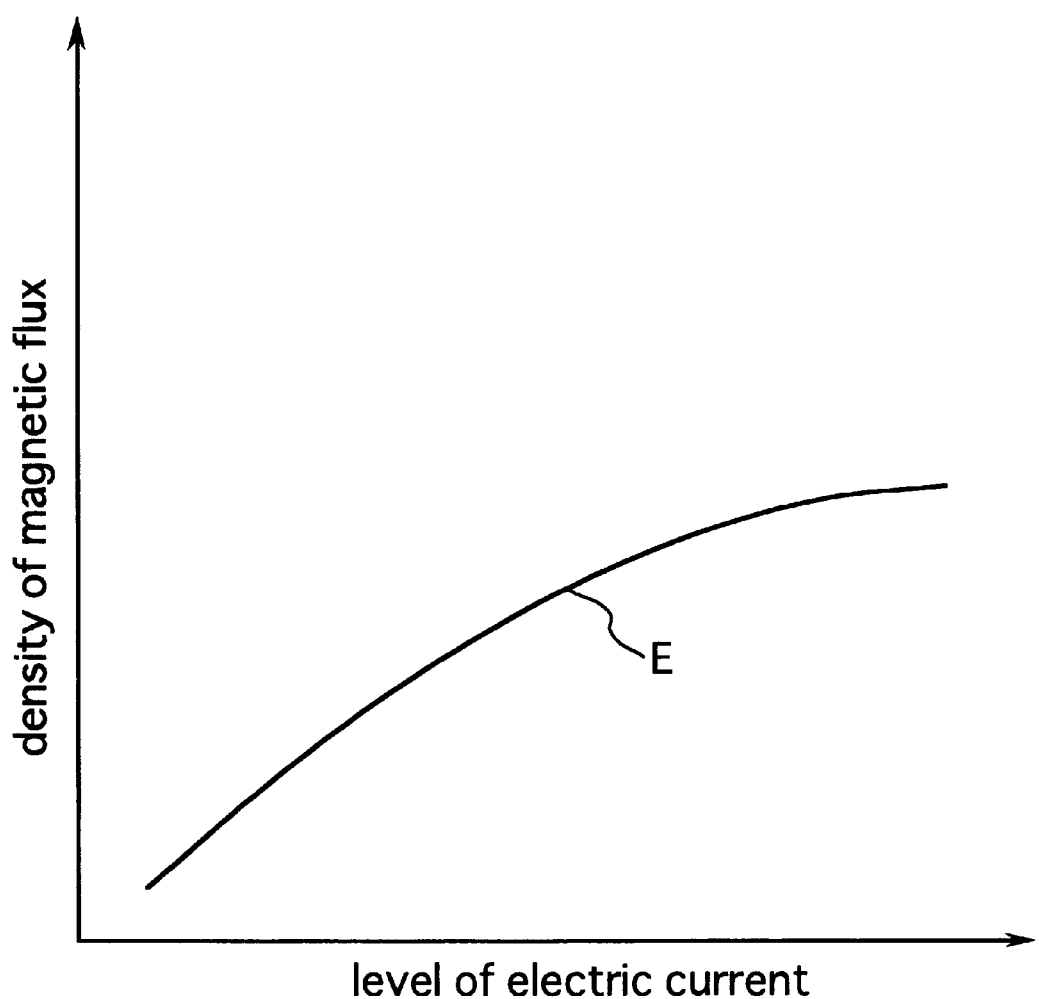

700 (PRIOR ART)

ELECTROMAGNETIC FORCE MOTOR AND METHOD OF MANUFACTURING THE SAME

FIELD OF THE INVENTION

The present invention relates in general to an electromagnetic force motor which is a kind of an electromagnetic actuator driven by an electromagnet, and more particularly to an electromagnetic force motor for driving, for example, a spool type valve forming part of a control valve and a method of manufacturing the electromagnetic force motor.

BACKGROUND OF THE INVENTION

In general, such an electromagnetic force motor of this type has been used, for instance, to drive the spool type valve for adjusting the flow or pressure of the fluid to be introduced into and discharged out of the control valve. The spool type valve and the electromagnetic force motor collectively constitute a direct operated solenoid servo valve. The direct operated electromagnetic valve is used, for example, for control of a hydraulic cylinder designed to control surfaces of an aircraft or for control of supplying a brake oil of a car.

Referring to FIG. 16, there is illustrated a typical conventional electromagnetic force motor 700 comprising a magnetic housing 710 made of a magnetic substance and having an axis 711. The electromagnetic force motor 700 further comprises a stationary magnetic member 720 made of a magnetic substance, and a movable magnetic member 740 also made of a magnetic substance and positioned in the magnetic housing 710 to be movable with respect to the magnetic housing 710 along the axis 711 of the magnetic housing 710. The stationary magnetic member 720 and the movable magnetic member 740 are partly in face-to-face relationship with and spaced apart from each other with an annular gap 701. The magnetic housing 710, the movable magnetic member 740, and the stationary magnetic member 720 collectively form a magnetic circuit unit 750 that is to allow a magnetic flux to pass therethrough. The electromagnetic force motor 700 further comprises a permanent magnet 780 located radially outwardly of the movable magnetic member 740 in the magnetic housing 710 to generate such a magnetic flux. The magnetic flux generated by the permanent magnet 780 produces a magnetic flux flow to circulate through the permanent magnet 780, the movable magnetic member 740, the stationary magnetic member 720, and the magnetic housing 710. The electromagnetic force motor 700 further comprises an electromagnetic coil 790 positioned between the stationary magnetic member 720 and the magnetic housing 710 to generate a magnetic flux with an electric current imparted thereto.

The strength of the magnetic attraction between the movable magnetic member 740 and the stationary magnetic member 720 increases in response to the decreased width of the annular gap 701, i.e. the increased moving distance of the movable magnetic member 740 with respect to the stationary magnetic member 720 as shown by the curved line "U" in FIG. 17. While the moving distance of the movable magnetic member 740 with respect to the stationary magnetic member 720 is within the range indicated by the legend "U1" in FIG. 17, the strength of the magnetic attraction between the movable magnetic member 740 and the stationary magnetic member 720 substantially linearly increases in response to the increased moving distance of the movable magnetic member 740 with respect to the stationary magnetic member 720. While, on the other hand, the moving distance of the movable magnetic member 740 with respect to the stationary magnetic member 720 is within the range indicated by the legend "U2" in FIG. 17, the strength of the magnetic attraction between the movable magnetic member 740 and the stationary magnetic member 720 nonlinearly increases in response to the increased moving distance of the movable magnetic member 740 with respect to the stationary magnetic member 720. For this reason, the width of the annular gap 701 has so far been determined to ensure that the moving distance of the movable magnetic member 740 with respect to the stationary magnetic member 720 is maintained within the range shown by the legend "U1" in FIG. 17 so that the moving distance of the movable magnetic member 740 with respect to the stationary magnetic member 720 can precisely be controlled in response to the electric current imparted to the electromagnetic coil 790.

In the case that the width of the annular gap 701 is determined to ensure that the moving distance of the movable magnetic member 740 with respect to the stationary magnetic member 720 is maintained within the range shown by the legend "U1" in FIG. 17, the width of the annular gap 701 is larger than the width of the annular gap 701 determined to ensure that the moving distance of the movable magnetic member 740 with respect to the stationary magnetic member 720 is maintained within the range shown by the legend "U2" in FIG. 17 at least at a moment. This results in the fact that the strength of the magnetic attraction between the movable magnetic member 740 and the stationary magnetic member 720 becomes smaller than the desired strength, in the case that the width of the annular gap 701 is determined to ensure that the moving distance of the movable magnetic member 740 with respect to the stationary magnetic member 720 is maintained within the range shown by the legend "U1" in FIG. 17.

Therefore, it is necessary to increase the level of the electric current imparted to the electromagnetic coil 790 to ensure that the strength of the magnetic attraction between the movable magnetic member 740 and the stationary magnetic member 720 becomes the desired strength.

On the other hand, the density of the magnetic flux between the movable magnetic member 740 and the stationary magnetic member 720 against the electric current imparted to the electromagnetic coil 790 is shown by the curved line "V" in FIG. 18. As will be seen from FIG. 18, the magnetic circuit unit 750 is saturated with the magnetic flux while the level of the electric current imparted to the electromagnetic coil 790 is within the range shown by the legend "V2". This means that the density of the magnetic flux between the movable magnetic member 740 and the stationary magnetic member 720 non-linearly increases in response to the increased level of the electric current imparted to the electromagnetic coil 790 within the range shown by the legend "V2" in FIG. 18. Therefore, the cross-sectional area of the magnetic circuit unit 750 has so far been determined to ensure that the density of the magnetic flux between the movable magnetic member 740 and the stationary magnetic member 720 substantially linearly increases in response to the increased level of the electric current imparted to the electromagnetic coil 790 under the state that the level of the electric current is maintained within the range shown by the legend "VI" in FIG. 18 so that the moving distance of the movable magnetic member 740 with respect to the stationary magnetic member 720 can precisely be controlled in response to the electric current imparted to the electromagnetic coil 790.

On the other hand, the range shown by the legend "V1" in FIG. 18 increases in response to the increased cross-sectional area of the magnetic circuit unit 750.

Therefore, it has also been necessary to increase the cross-sectional area of the magnetic circuit unit 750 to ensure that the strength of the magnetic attraction between the movable magnetic member 740 and the stationary magnetic member 720 becomes the desired strength.

The fact that at least one of the width of the annular gap 701 and the cross-sectional area of the magnetic circuit unit 750 are relatively large results in the fact that the size and weight of the electromagnetic force motor 700 become relatively large.

In the meantime, the direct operated solenoid servo valve is desired to become as small as possible resulting from the fact that the direct operated solenoid servo valve is required to be as light as possible particularly when it is used as a direct operated solenoid servo valve in the aircraft.

It is, therefore, an object of the present invention to provide an electromagnetic force motor, which is reduced in size while effectively maintaining its performance at almost the same level as that of the conventional electromagnetic force motor.

It is another object of the present invention to provide a method of manufacturing an electromagnetic force motor which can effectively work at almost the same level as that of the conventional electromagnetic force motor with its size reduced.

SUMMARY OF THE INVENTION

According to the first aspect of the present invention, there is provided an electromagnetic force motor comprising: a magnetic housing made of a magnetic substance and having an axis, the magnetic housing being in the form of a cylindrical hollow shape to have a housing chamber formed therein; stationary magnetic member made of a magnetic substance and received in the housing chamber in stationary relationship with respect to the magnetic housing, the stationary magnetic member having a magnetic flux surface substantially perpendicularly extending to the axis of the magnetic housing to permit a magnetic flux to pass therethrough; a movable magnetic member made of a magnetic substance and received in the housing chamber to be movable with respect to the magnetic housing along the axis of the magnetic housing to assume first and second axial positions axially spaced apart from each other, the first axial position of the movable magnetic member being closer to the stationary magnetic member than the second axial position of the movable magnetic member, the movable magnetic member having a magnetic flux surface substantially perpendicularly extending to the axis of the magnetic housing to be held in face-to-face relationship with the magnetic flux surface of the stationary magnetic member with a magnetic flux gap to permit a magnetic flux to pass therethrough, the magnetic housing, the stationary magnetic member, and the movable magnetic member collectively forming a magnetic circuit unit that is to allow a magnetic flux to pass therethrough; support means for supporting the movable magnetic member to ensure that the movable magnetic member is movable along the axis of the magnetic housing to assume the first and second axial positions of the movable magnetic member; biasing means for axially resiliently biasing the movable magnetic member toward the second axial position of the movable magnetic member; a permanent magnet positioned in the housing chamber and radially between the magnetic housing and the movable magnetic member to generate a magnetic flux; and an electromagnetic coil positioned between the stationary magnetic member and the permanent magnet in the housing chamber in axial alignment with the stationary magnetic member and the permanent magnet to generate a magnetic flux with an electric current imparted thereto, the magnetic circuit unit partly having a diminished cross-sectional area being sized enough to ensure that the magnetic circuit unit is saturated with the magnetic flux as the movable magnetic member is positioned in the neighborhood of the first axial position of the movable magnetic member, the width of the magnetic flux gap being sized to ensure that the strength of the magnetic attraction between the stationary magnetic member and the movable magnetic member increases in response to the increased density of the magnetic flux flowing between the magnetic surface of the stationary magnetic member and the magnetic surface of the movable magnetic member with an increase rate increasing as the movable magnetic member is positioned in the neighborhood of the first axial position of the movable magnetic member, the diminished cross-sectional area of the magnetic circuit unit and the width of the magnetic flux gap being each sized to ensure that the strength of the magnetic attraction between the stationary magnetic member and the movable magnetic member substantially linearly increases in response to the increased level of the electric current imparted to the electromagnetic coil under the influence of each of the diminished cross-sectional area of the magnetic circuit unit and the width of the magnetic flux gap as the movable magnetic member is positioned in the neighborhood of the first axial position of the movable magnetic member.

According to the second aspect of the present invention, there is provided an electromagnetic force motor comprising: a magnetic housing made of a magnetic substance and having an axis, the magnetic housing being in the form of a cylindrical hollow shape to have a housing chamber formed therein; first and second stationary magnetic members each made of a magnetic substance and each received in the housing chamber in stationary relationship with respect to the magnetic housing, the first and second stationary magnetic members each having a magnetic flux surface substantially perpendicularly extending to the axis of the magnetic housing to permit a magnetic flux to pass therethrough; a movable magnetic member made of a magnetic substance and received in the housing chamber to be movable with respect to the magnetic housing along the axis of the magnetic housing to assume first, second, and third axial positions axially spaced apart from each other, the first axial position of the movable magnetic member being closer to the first stationary magnetic member than the third axial position of the movable magnetic member, the third axial position of the movable magnetic member being closer to the second stationary magnetic member than the first axial position of the movable magnetic member, the second axial position of the movable magnetic member being between the first and third axial positions of the movable magnetic member, the movable magnetic member having a first magnetic flux surface substantially perpendicularly extending to the axis of the magnetic housing to be held in face-to-face relationship with the magnetic flux surface of the first stationary magnetic member with a first magnetic flux gap to permit a magnetic flux to pass therethrough, the movable magnetic member having a second magnetic flux surface substantially perpendicularly extending to the axis of the magnetic housing to be held in face-to-face relationship with the magnetic flux surface of the second stationary magnetic member with a second magnetic flux gap to permit a magnetic flux to pass therethrough, the magnetic housing, the first and second stationary magnetic members, and the movable magnetic member collectively forming a magnetic circuit unit that is to allow a magnetic flux to pass therethrough; support means for supporting the movable magnetic member to ensure that the movable magnetic member is movable along the axis of the magnetic housing to assume the first, second, and third axial positions of the movable magnetic member; biasing means for axially resiliently biasing the movable magnetic member toward the second axial position of the movable magnetic member; a permanent magnet positioned in the housing chamber and radially between the magnetic housing and the movable magnetic member to generate a magnetic flux; a first electromagnetic coil positioned between the first stationary magnetic member and the permanent magnet in the housing chamber in axial alignment with the first stationary magnetic member and the permanent magnet to generate a magnetic flux with an electric current imparted thereto; and a second electromagnetic coil positioned between the second stationary magnetic member and the permanent magnet in the housing chamber in axial alignment with the second stationary magnetic member and the permanent magnet to generate a magnetic flux with an electric current imparted thereto, the magnetic circuit unit partly having a diminished cross-sectional area sized enough to ensure that the magnetic circuit unit is saturated with the magnetic flux as the movable magnetic member is positioned in the neighborhood of the first and second axial positions of the movable magnetic member, the width of the first magnetic flux gap sized enough to ensure that the strength of the magnetic attraction between the first stationary magnetic member and the movable magnetic member increases in response to the increased density of the magnetic flux flowing between the magnetic surface of the first stationary magnetic member and the first magnetic surface of the movable magnetic member with an increase rate increasing as the movable magnetic member is positioned in the neighborhood of the first axial position of the movable magnetic member, the diminished cross-sectional area of the magnetic circuit unit and the width of the first magnetic flux gap being each sized to ensure that the strength of the magnetic attraction between the first stationary magnetic member and the movable magnetic member substantially linearly increases in response to the increased level of the electric current imparted to at least one of the first and second electromagnetic coils and under the influence of each of the diminished cross-sectional area of the magnetic circuit unit and the width of the first magnetic flux gap as the movable magnetic member is positioned in the neighborhood of the first axial position of the movable magnetic member, the width of the second magnetic flux gap being sized to ensure that the strength of the magnetic attraction between the second stationary magnetic member and the movable magnetic member increases in response to the increased density of the magnetic flux flowing between the magnetic surface of the second stationary magnetic member and the second magnetic surface of the movable magnetic member with an increase rate increasing as the movable magnetic member is positioned in the neighborhood of the third axial position of the movable magnetic member, the diminished cross-sectional area of the magnetic circuit unit and the width of the second magnetic flux gap being each sized to ensure that the strength of the magnetic attraction between the second stationary magnetic member and the movable magnetic member substantially linearly increases in response to the increased level of the electric current imparted to at least one of the first and second electromagnetic coils and under the influence of each of the diminished cross-sectional area of the magnetic circuit unit and the width of the second magnetic flux gap as the movable magnetic member is positioned in the neighborhood of the third axial position of the movable magnetic member.

According to the third aspect of the present invention, there is provided a method of manufacturing an electromagnetic force motor comprising the steps of: (a) preparing: a magnetic housing made of a magnetic substance and having an axis, the magnetic housing being in the form of a cylindrical hollow shape to have a housing chamber formed therein; stationary magnetic member made of a magnetic substance and received in the housing chamber in stationary relationship with respect to the magnetic housing, the stationary magnetic member having a magnetic flux surface substantially perpendicularly extending to the axis of the magnetic housing to permit a magnetic flux to pass therethrough; a movable magnetic member made of a magnetic substance and received in the housing chamber to be movable with respect to the magnetic housing along the axis of the magnetic housing to assume first and second axial positions axially spaced apart from each other, the first axial position of the movable magnetic member being closer to the stationary magnetic member than the second axial position of the movable magnetic member, the movable magnetic member having a magnetic flux surface substantially perpendicularly extending to the axis of the magnetic housing to be held in face-to-face relationship with the magnetic flux surface of the stationary magnetic member with a magnetic flux gap to permit a magnetic flux to pass therethrough, the magnetic housing, the stationary magnetic member, and the movable magnetic member collectively forming a magnetic circuit unit that is to allow a magnetic flux to pass therethrough; support means for supporting the movable magnetic member to ensure that the movable magnetic member is movable along the axis of the magnetic housing to assume the first and second axial positions of the movable magnetic member; biasing means for axially resiliently biasing the movable magnetic member toward the second axial position of the movable magnetic member; a permanent magnet positioned in the housing chamber and radially between the magnetic housing and the movable magnetic member to generate a magnetic flux; and an electromagnetic coil positioned between the stationary magnetic member and the permanent magnet in the housing chamber in axial alignment with the stationary magnetic member and the permanent magnet to generate a magnetic flux with an electric current imparted thereto; (b) adjusting the width of the magnetic flux gap to ensure that the strength of the magnetic attraction between the stationary magnetic member and the movable magnetic member increases in response to the increased density of the magnetic flux flowing between the magnetic surface of the stationary magnetic member and the magnetic surface of the movable magnetic member with an increase rate increasing as the movable magnetic member is positioned in the neighborhood of the first axial position of the movable magnetic member; and (c) adjusting the cross-sectional area of at least part of the magnetic circuit unit to ensure that the magnetic circuit unit is saturated with the magnetic flux, and the strength of the magnetic attraction between the stationary magnetic member and the movable magnetic member substantially linearly increases in response to the increased level of the electric current imparted to the electromagnetic coil under the influence of each of the diminished cross-sectional area of the magnetic circuit unit and the width of the magnetic flux gap, as the movable magnetic member is positioned in the neighborhood of the first axial position of the movable magnetic member.

According to the fourth aspect of the present invention, there is provided a method of manufacturing an electromagnetic force motor comprising the steps of: (a) preparing: a magnetic housing made of a magnetic substance and having an axis, the magnetic housing being in the form of a cylindrical hollow shape to have a housing chamber formed therein; stationary magnetic member made of a magnetic substance and received in the housing chamber in stationary relationship with respect to the magnetic housing, the stationary magnetic member having a magnetic flux surface substantially perpendicularly extending to the axis of the magnetic housing to permit a magnetic flux to pass therethrough; a movable magnetic member made of a magnetic substance and received in the housing chamber to be movable with respect to the magnetic housing along the axis of the magnetic housing to assume first and second axial positions axially spaced apart from each other, the first axial position of the movable magnetic member being closer to the stationary magnetic member than the second axial position of the movable magnetic member, the movable magnetic member having a magnetic flux surface substantially perpendicularly extending to the axis of the magnetic housing to be held in face-to-face relationship with the magnetic flux surface of the stationary magnetic member with a magnetic flux gap to permit a magnetic flux to pass therethrough, the magnetic housing, the stationary magnetic member, and the movable magnetic member collectively forming a magnetic circuit unit that is to allow a magnetic flux to pass therethrough; support means for supporting the movable magnetic member to ensure that the movable magnetic member is movable along the axis of the magnetic housing to assume the first and second axial positions of the movable magnetic member; biasing means for axially resiliently biasing the movable magnetic member toward the second axial position of the movable magnetic member; a permanent magnet positioned in the housing chamber and radially between the magnetic housing and the movable magnetic member to, generate a magnetic flux; and an electromagnetic coil positioned between the stationary magnetic member and the permanent magnet in the housing chamber in axial alignment with the stationary magnetic member and the permanent magnet to generate a magnetic flux with an electric current imparted thereto; (b) adjusting the cross-sectional area of at least part of the magnetic circuit unit to ensure that the magnetic circuit unit is saturated with the magnetic flux as the movable magnetic member is positioned in the neighborhood of the first axial position of the movable magnetic member; and (c) adjusting the width of the magnetic flux gap to ensure that the strength of the magnetic attraction between the stationary magnetic member and the movable magnetic member increases in response to the increased density of the magnetic flux flowing between the magnetic surface of the stationary magnetic member and the magnetic surface of the movable magnetic member with an increase rate increasing, and the strength of the magnetic attraction between the stationary magnetic member and the movable magnetic member substantially linearly increases in response to the increased level of the electric current imparted to the electromagnetic coil under the influence of each of the diminished cross-sectional area of the magnetic circuit unit and the width of the magnetic flux gap, as the movable magnetic member is positioned in the neighborhood of the first axial position of the movable magnetic member.

BRIEF DESCRIPTION OF THE DRAWINGS

The features and advantages of an electromagnetic force motor according to the present invention will be more clearly understood from the following description taken in conjunction with the accompanying drawings in which:

FIG. 6 is a graph showing the relation between the moving distance and the level of an electric current under the state that the moving distance substantially linearly increases in response to the increased level of the electric current for explaining the electromagnetic force motor illustrated in FIG. 2;

FIG. 7 is a graph showing the relation between the density of a magnetic flux and the level of an electric current under the state that the density of the magnetic flux non-linearly increases in response to the increased level of the electric current for explaining the electromagnetic force motor illustrated in FIG. 2;

DESCRIPTION OF THE PREFERRED EMBODIMENTS

Figure 1:
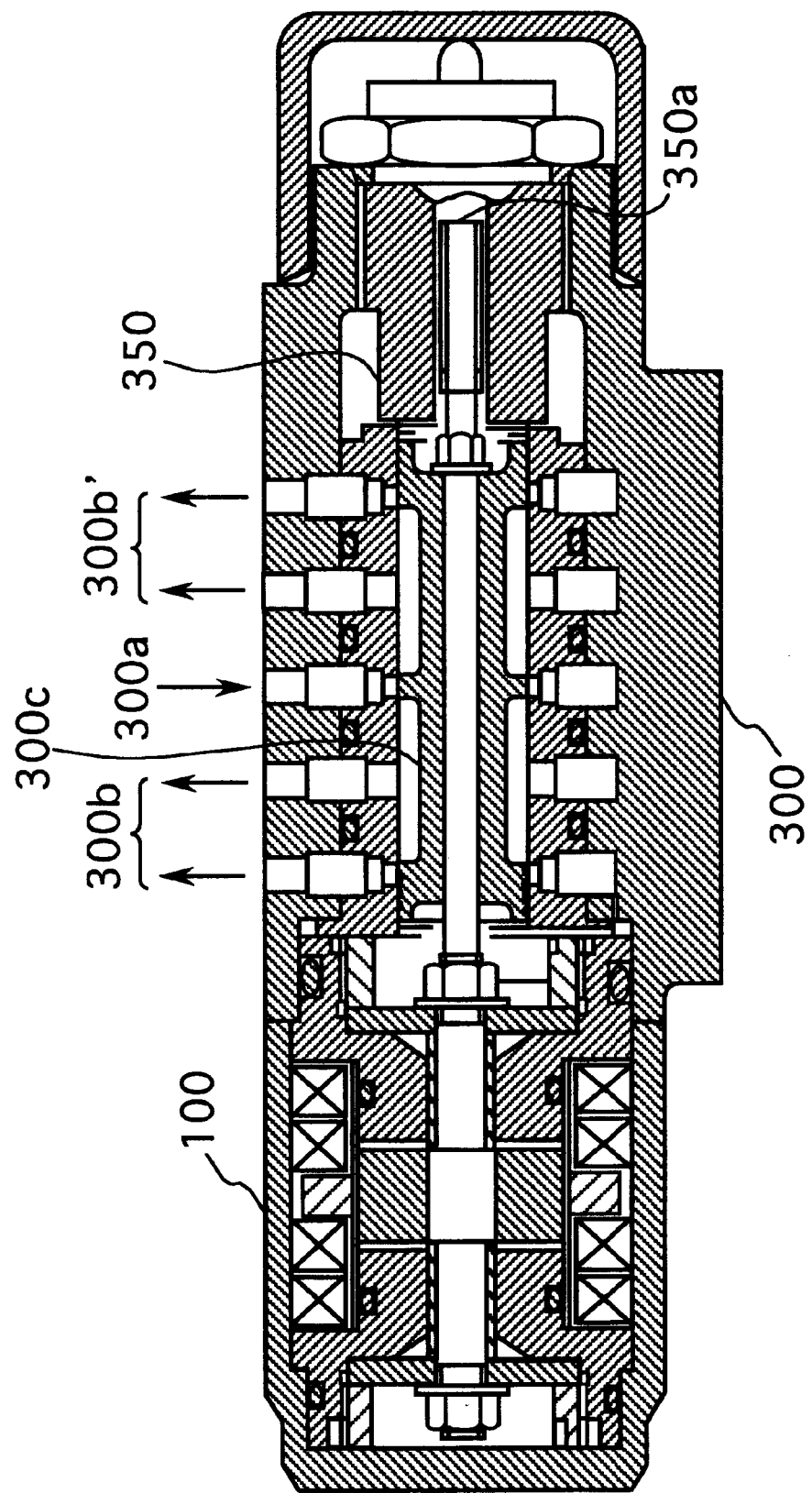
FIG. 1 is a cross-sectional view of a first preferred embodiment of an electromagnetic force motor according to the present invention.
Figure 2:
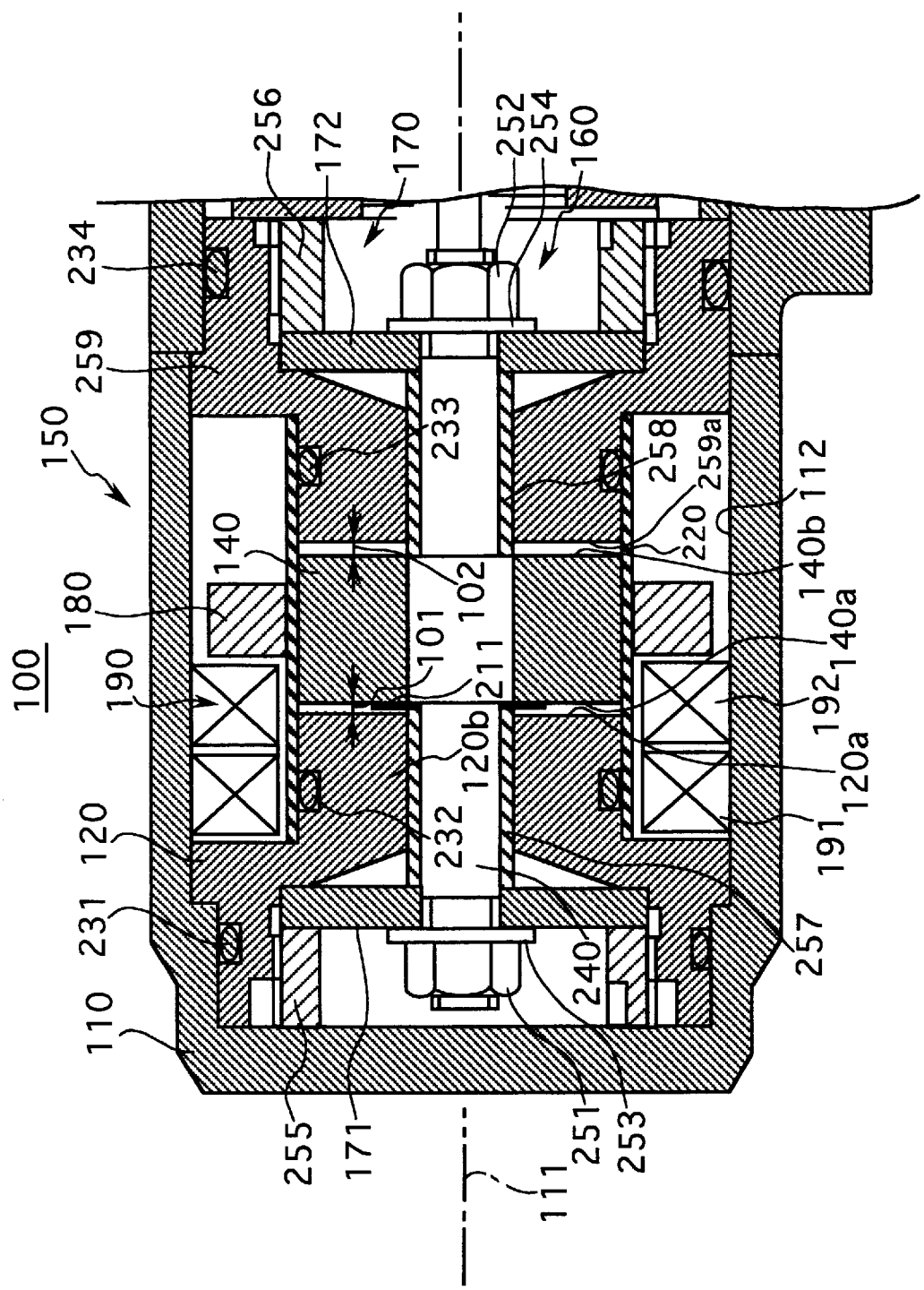
FIG. 2 is a fragmentary cross-sectional view of the electromagnetic force motor illustrated in FIG. 1.

Referring to FIGS. 1 and 2 of the drawings, there is shown a first preferred embodiment of the electromagnetic force motor according to the present invention. The electromagnetic force motor 100 forms part of a direct operated solenoid servo valve comprising a control valve 300 for controlling a hydraulic cylinder (not shown), in FIG. 1. The control valve 300 comprises an input port 300a for permitting oil to be inputted into the control valve 300, output and drain ports 300b and 300b' for permitting oil to be outputted out of the control valve 300, and a spool 300c for permitting the input port 300a to be held in communication with at least one of the output and drain ports 300b and 300b'. The spool 300c is operatively connected to and controlled by the electromagnetic force motor 100. The direct operated solenoid servo valve further comprises a differential transformer 350 comprising a movable iron rod 350a, which is connected to the spool 300c, and detecting the displacement of the spool 300c to generate an electric signal in response to the detected displacement of the spool 300c. The electric signal generated by the differential transformer 350 is used to control the electromagnetic force motor 100 precisely by well-known means.

The electromagnetic force motor 100 is shown in FIG. 2 as comprising a magnetic housing 110 made of a magnetic substance and having an axis 111. The magnetic housing 110 is in the form of a cylindrical hollow shape to have a housing chamber 112 formed therein.

The electromagnetic force motor 100 further comprises a stationary magnetic member 120 made of a magnetic substance and in the form of an annular shape. The stationary magnetic member 120 is received in the housing chamber 112 in coaxial relationship with the magnetic housing 110 in stationary relationship with respect to the magnetic housing 110 in such a manner that the stationary magnetic member 120 is fixed on the magnetic housing 110. The stationary magnetic member 120 has a magnetic flux surface 120a substantially perpendicularly extending to the axis 111 of the magnetic housing 110 to permit a magnetic flux to pass therethrough.

The electromagnetic force motor 100 further comprises a stationary non-magnetic member 259 made of a non-magnetic substance and in the form of an annular shape. The stationary non-magnetic member 259 is received in the housing chamber 112 in coaxial relationship with the magnetic housing 110 in stationary relationship with respect to the magnetic housing 110 in such a manner that the stationary magnetic member 120 is fixed on the magnetic housing 110. The stationary non-magnetic member 259 has a side surface 259a substantially perpendicularly extending to the axis 111 of the magnetic housing 110.

The electromagnetic force motor 100 further comprises a movable magnetic member 140 made of a magnetic substance and in the form of an annular shape. The movable magnetic member 140 is received in the housing chamber 112 in coaxial relationship with the magnetic housing 110 to be movable with respect to the magnetic housing 110 along the axis 111 of the magnetic housing 110 to assume first and second axial positions axially spaced apart from each other. The first axial position of the movable magnetic member 140 is closer to the stationary magnetic member 120 than the second axial position of the movable magnetic member 140. The movable magnetic member 140 has a magnetic flux surface 140a substantially perpendicularly extending to the axis 111 of the magnetic housing 110 to be held in face-to-face relationship with the magnetic flux surface 120a of the stationary magnetic member 120 with a magnetic flux gap 101 to permit a magnetic flux to pass therethrough. The movable magnetic member 140 further has a side surface 140b substantially perpendicularly extending to the axis 111 of the magnetic housing 110 to be held in face-to-face relationship with the side surface 259a of the stationary non-magnetic member 259 with a side gap 102.

The magnetic housing 110, the stationary magnetic member 120, and the movable magnetic member 140 collectively form a magnetic circuit unit 150 that is to allow a magnetic flux to pass therethrough.

The electromagnetic force motor 100 further comprises support means 160 for supporting the movable magnetic member 140 to ensure that the movable magnetic member 140 is movable along the axis 111 of the magnetic housing 110 to assume the first and second axial positions of the movable magnetic member 140.

The support means 160 is composed of a movable rod 240 made of a non-magnetic substance and held in coaxial relationship with the magnetic housing 110. The movable rod 240 has a longitudinally center portion, a first longitudinally end portion, and a second longitudinally end portion closer to the stationary non-magnetic member 259 than the first longitudinally end portion. The movable rod 240 is integrally formed with the movable magnetic member 140 in such a manner that the longitudinally center portion of the movable rod 240 is inserted into and fixed to the movable magnetic member 140. The movable rod 240 is integrally formed with the spool 300c under the state that the movable rod 240 and the spool 300c are in axial alignment with each other (see FIG. 1).

Referring back to FIG. 2, the support means 160 further is composed of a non-magnetic stopper 211 in the form of an annular shape and made of a non-magnetic substance. The non-magnetic stopper 211 is positioned in the housing chamber 112 in coaxial relationship with the magnetic housing 110 under the state that the movable rod 240 is inserted into the non-magnetic stopper 211, and the non-magnetic stopper 211 is contacted with the movable magnetic member 140 on the magnetic surface 140a. The non-magnetic stopper 211 is positioned between the stationary magnetic member 120 and the movable magnetic member 140 to prevent the stationary magnetic member 120 and the movable magnetic member 140 from being adhered to each other.

The support means 160 further is composed of first and second non-magnetic sleeves 257 and 258 each made of a non-magnetic substance and permitting the movable rod 240 to be inserted thereinto under the state that the first non-magnetic sleeve 257 is positioned in the neighborhood of the first longitudinally end portion of the movable rod 240 and contacted with the non-magnetic stopper 211 and that the second non-magnetic sleeve 258 is positioned in the neighborhood of the second longitudinally end portion of the movable rod 240. The first non-magnetic sleeve 257 is positioned radially inward of the stationary magnetic member 120 with an annular gap between the outer surface of the first non-magnetic sleeve 257 and the inner surface of the stationary magnetic member 120. The annular gap between the outer surface of the first non-magnetic sleeve 257 and the inner surface of the stationary magnetic member 120 is sized to ensure that the first non-magnetic sleeve 257 can axially move with respect to the stationary magnetic member 120. In similar manner, the second nonmagnetic sleeve 258 is positioned radially inward of the stationary non-magnetic member 259 with an annular gap between the outer surface of the second non-magnetic sleeve 258 and the inner surface of the stationary non-magnetic member 259. The annular gap between the outer surface of the second non-magnetic sleeve 258 and the inner surface of the stationary non-magnetic member 259 is sized to ensure that the second non-magnetic sleeve 258 can axially move with respect to the stationary non-magnetic member 259.

The support means 160 further is composed of first and second disk springs 171 and 172 each with a plurality of holes drilled therein in spiral relationship with each other and each made of a steal. The first and second disk springs 171 and 172 each permit the movable rod 240 to be inserted thereinto. The first and second disk springs 171 and 172 each have a radially inward portion. The radially inward portions of the first and second disk springs 171 and 172 are respectively fixed to the first and second non-magnetic sleeves 257 and 258 respectively by the washer 253 and the nut 251 permitting the first longitudinally end portion of the movable rod 240 to be screwed thereinto, and the washer 254 and the nut 252 permitting the second longitudinally end portion of the movable rod 240 to be screwed thereinto. The first and second disk springs 171 and 172 each have a radially outward portion. The radially outward portions of the first and second disk springs 171 and 172 are respectively fixed to the stationary magnetic member 120 and the stationary non-magnetic member 259 respectively by nuts 255 and 256.

The support means 160 further is composed of the stationary magnetic member 120 and the stationary magnetic member 259 each held in stationary relationship with respect to the magnetic housing 110.

The electromagnetic force motor 100 further comprises biasing means 170 for axially resiliently biasing the movable magnetic member 140 toward the second axial position of the movable magnetic member 140. The biasing means 170 is composed of the first and second disk springs 171 and 172.

The electromagnetic force motor 100 further comprises a permanent magnet 180 in the form of an annular shape. The permanent magnet 180 is positioned in the housing chamber 112 in coaxial relationship with the magnetic housing 110 and radially between the magnetic housing 110 and the movable magnetic member 140 to generate a magnetic flux. The magnetic flux generated by the permanent magnet 180 has a magnetic flux flow to circulate through the permanent magnet 180, the movable magnetic member 140, the stationary magnetic member 120, and the magnetic housing 110.

The electromagnetic force motor 100 further comprises an electromagnetic coil 190 in the form of an annular shape. The electromagnetic coil 190 is positioned between the stationary magnetic member 120 and the permanent magnet 180 in the housing chamber 112 in axial alignment with the stationary magnetic member 120 and the permanent magnet 180 to generate a magnetic flux with an electric current imparted thereto. The electromagnetic coil 190 is composed of two coils 191 and 192 each fixed to the magnetic housing 110. The coils 191 and 192 are in electrically parallel relationship with each other and each comprise a wire small in diameter enough to ensure that the electromagnetic coil 190 is small in diameter enough to be received in the housing chamber 112.

On the other hand, the stationary magnetic member 120 has an axial portion 120b. The electromagnetic coil 190 is positioned radially outwardly of the axial portion 120b of the stationary magnetic member 120.

The electromagnetic force motor 100 further comprises a non-magnetic member 220 in the form of an annular shape and made of a non-magnetic substance. The non-magnetic member 220 is positioned in the housing chamber 112 in coaxial relationship with the magnetic housing 110. The non-magnetic member 220 is positioned radially outwardly of the movable magnetic member 140 with a gap between the inner surface of the non-magnetic member 220 and the outer surface of the movable magnetic member 140, and radially inwardly of the permanent magnet 180 and the electromagnetic coil 190. The non-magnetic member 220 is fixed on the stationary magnetic member 120 and the stationary non-magnetic member 259 and permits the permanent magnet 180 to be fixed thereon. The magnetic housing 110, the stationary magnetic member 120, the stationary non-magnetic member 259, and the non-magnetic member 220 collectively tightly enclose the electromagnetic coil 190 and the permanent magnet 180. The gap between the inner surface of the non-magnetic member 220 and the outer surface of the movable magnetic member 140 is sized to ensure that the movable magnetic member 140 can axially move with respect to the non-magnetic member 220.

The electromagnetic force motor 100 further comprises four oil seals 231, 232, 233, and 234. The oil seal 231 seals the gap between the magnetic housing 110 and the stationary magnetic member 120. The oil seal 232 seals the gap between the non-magnetic member 220 and the stationary magnetic member 120. The oil seal 233 seals the gap between the stationary non-magnetic member 259 and the non-magnetic member 220. The oil seal 234 seals the gap between the magnetic housing 110 and the stationary non-magnetic member 259.

The oil seals 231, 232, 233, and 234, the magnetic housing 110, the stationary magnetic member 120, the stationary non-magnetic member 259, and the non-magnetic member 220 collectively prevent the electromagnetic coil 190 and the permanent magnet 180 from being exposed to the oil escaping from the control valve 300 (see FIG. 1).

Referring back to FIG. 2, the magnetic circuit unit 150 partly, according to the present preferred embodiment in the magnetic housing 110, has a diminished cross-sectional area sized to ensure that the magnetic circuit unit 150 is saturated with the magnetic flux as the movable magnetic member 140 is positioned in the neighborhood of the first axial position of the movable magnetic member 140. Explaining in detail, the diminished cross-sectional area is sized to ensure that the density of the magnetic flux flowing between the magnetic surfaces 120a and 140a increases in response to the increased level of the electric current imparted to the electromagnetic coil 190 with an increase rate decreasing, as shown by the curved line "E" in FIG. 7, as the movable magnetic member 140 is positioned in the neighborhood of the first axial position of the movable magnetic member 140.

Figure 8:
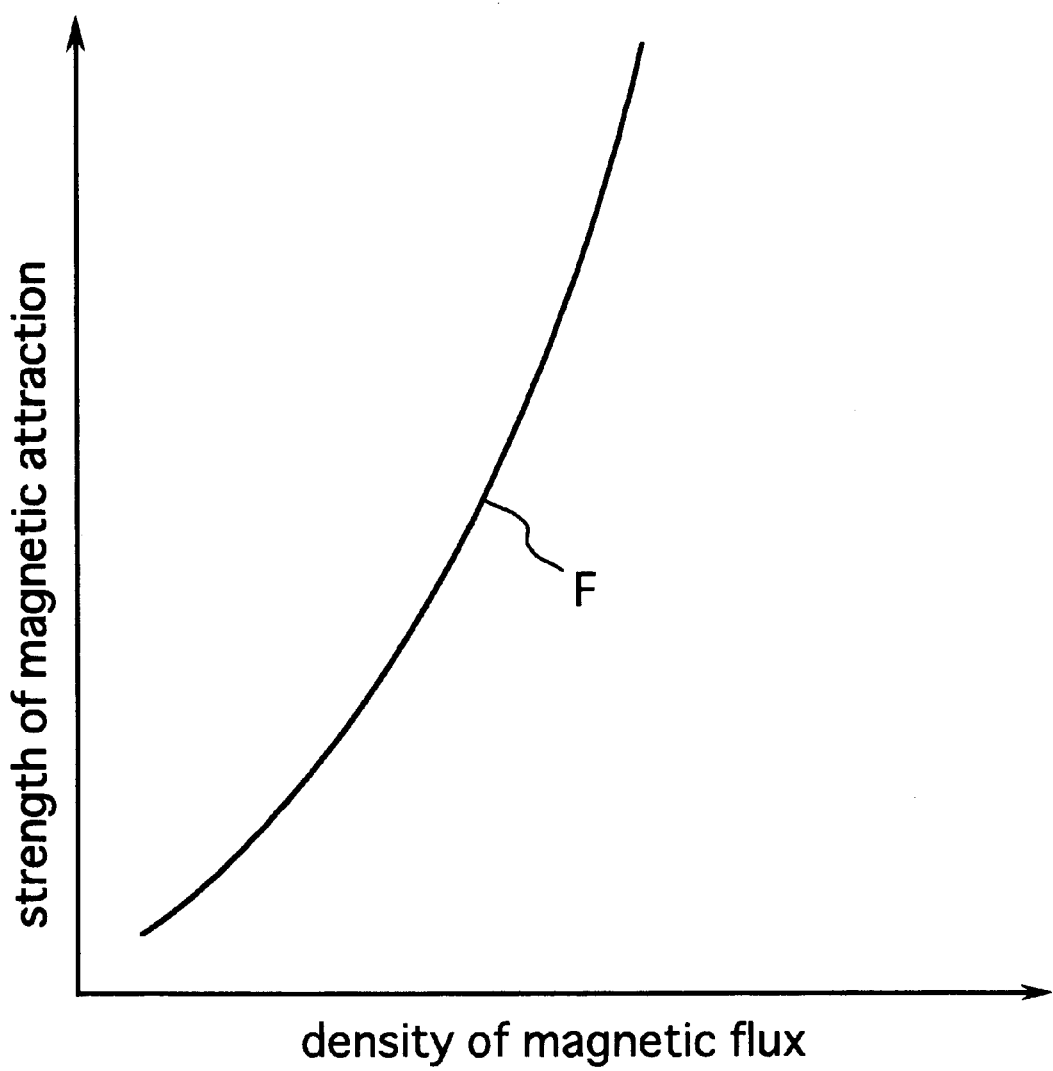
FIG. 8 is a graph showing the relation between the strength of a magnetic attraction and the density of a magnetic flux under the state that the strength of a magnetic attraction non-linearly increases in response to the increased density of the magnetic flux for explaining the electromagnetic force motor illustrated in FIG. 2.

The width of the magnetic flux gap 101 is sized to ensure that the strength of the magnetic attraction between the stationary magnetic member 120 and the movable magnetic member 140 increases in response to the increased density of the magnetic flux flowing between the magnetic surfaces 120a and 140a with an increase rate increasing, as shown by the curved line "F" in FIG. 8, as the movable magnetic member 140 is positioned in the neighborhood of the first axial position of the movable magnetic member 140.

Figure 5:
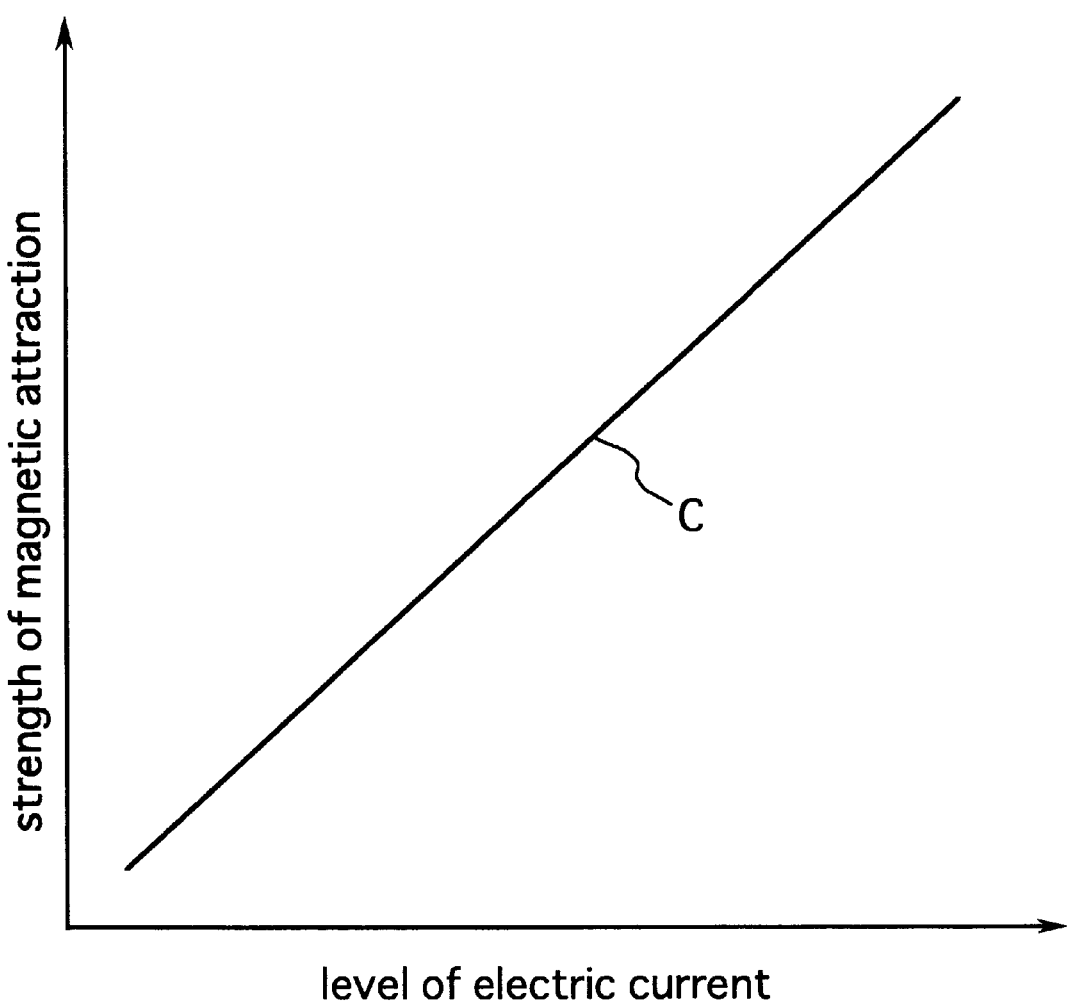
FIG. 5 is a graph showing the relation between the strength of a magnetic attraction and the level of an electric current under the state that the strength of the magnetic attraction substantially linearly increases in response to the increased level of the electric current for explaining the electromagnetic force motor illustrated in FIG. 2.

Further, the diminished cross-sectional area of the magnetic circuit unit 150 and the width of the magnetic flux gap 101 are each sized to ensure that the strength of the magnetic attraction between the stationary magnetic member 120 and the movable magnetic member 140 substantially linearly increases in response to the increased level of the electric current imparted to the electromagnetic coil 190, as shown by the substantially straight line "C" in FIG. 5, under the influence of each of the diminished cross-sectional area of the magnetic circuit unit 150 and the width of the magnetic flux gap 101.

The operation of the electromagnetic force motor 100 previously mentioned will be described hereinafter with reference to FIG. 2.

When the electric current is not imparted to the magnetic coil 190, the magnetic flux flow is generated by the permanent magnet 180 in the magnetic circuit unit 150. At this time, the magnetic attraction between the magnetic surfaces 120a and 140a is equal in strength to the elastic force generated by the disk springs 171 and 172. This results in the fact that the movable magnetic member 140 is positioned in the second axial position of the movable magnetic member 140.

When the electric current is imparted to the magnetic coil 190 to ensure that the magnetic flux generated by the magnetic coil 190 flows from the movable magnetic member 140 through the magnetic gap 101 to the stationary magnetic member 120, the strength of the magnetic attraction between the stationary magnetic member 120 and the movable magnetic member 140 increases in response to the increased density of the magnetic flux flowing from the movable magnetic member 140 through the magnetic gap 101 to the stationary magnetic member 120. At this time, the movable magnetic member 140 moves toward the first axial position of the movable magnetic member 140 to the position where the magnetic attraction between the stationary magnetic member 120 and the movable magnetic member 140 is equal in strength to the elastic force generated by the both the disk springs 171 and 172.

Figure 3:
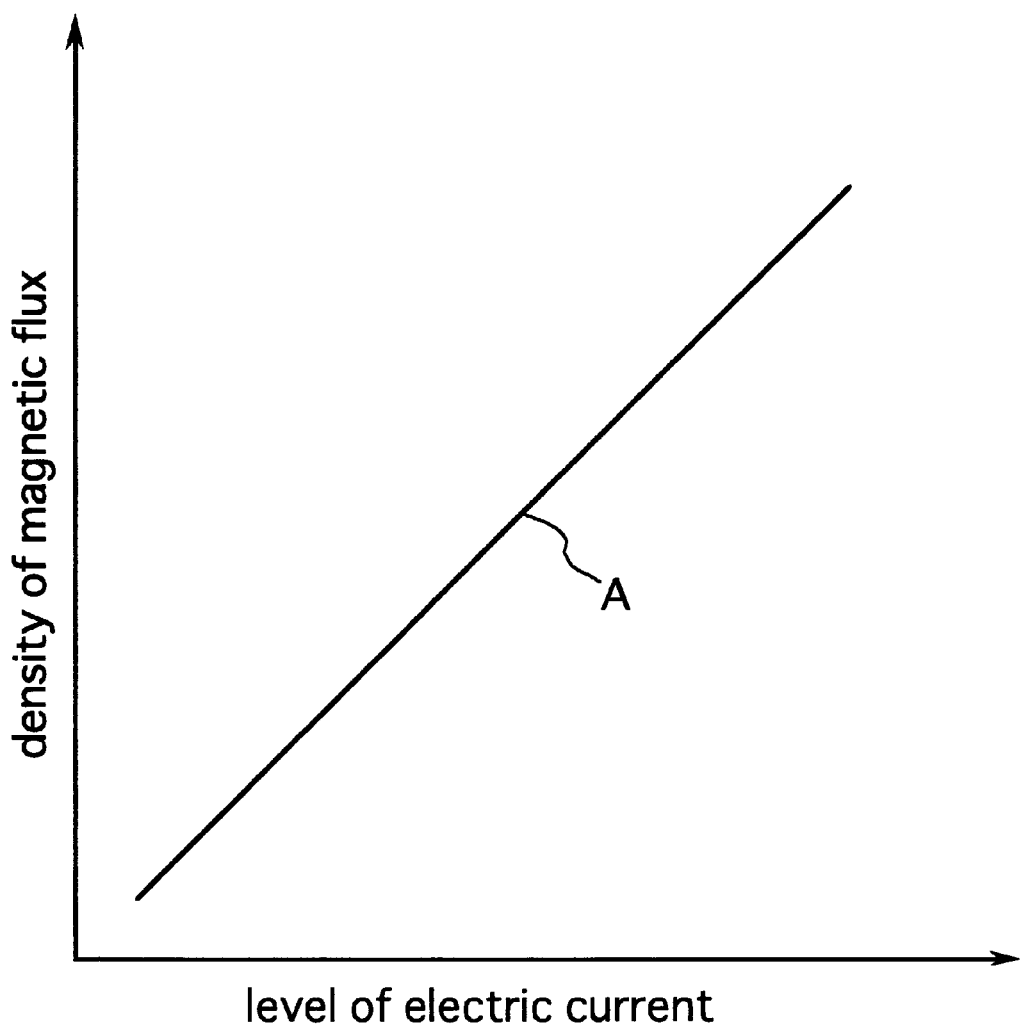
FIG. 3 is a graph showing the relation between the density of a magnetic flux and the level of an electric current under the state that the density of the magnetic flux substantially linearly increases in response to the increased level of the electric current for explaining the electromagnetic force motor illustrated in FIG. 2.
Figure 4:
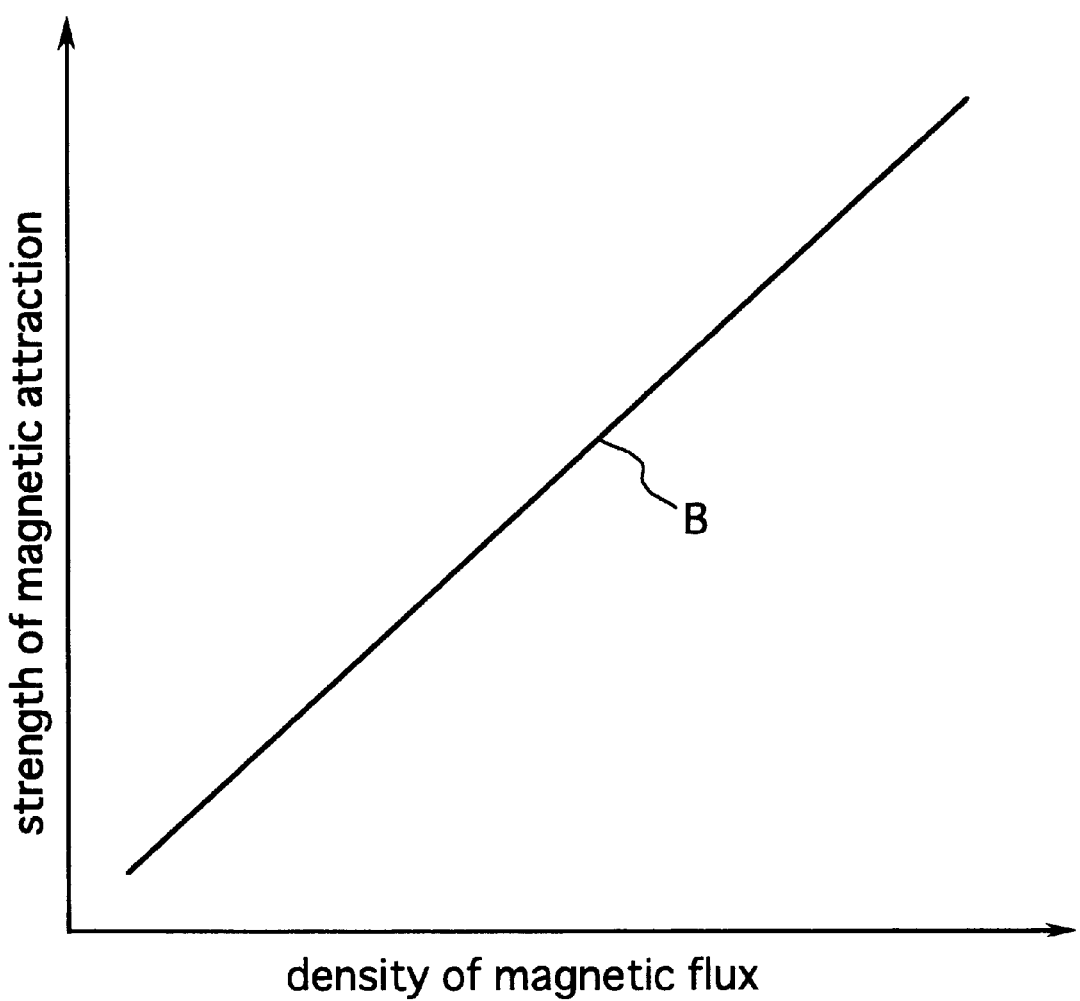
FIG. 4 is a graph showing the relation between the strength of a magnetic attraction and the density of a magnetic flux under the state that the strength of a magnetic attraction substantially linearly increases in response to the increased density of the magnetic flux for explaining the electromagnetic force motor illustrated in FIG. 2.

As the movable magnetic member 140 is positioned away from the neighborhood of the first axial position of the movable magnetic member 140 and in the neighborhood of the second axial position of the movable magnetic member 140, the magnetic circuit unit 150 is not saturated with the magnetic flux. Explaining in detail, the density of the magnetic flux flowing between the magnetic surfaces 120a and 140a substantially linearly increases in response to the increased level of the electric current imparted to the electromagnetic coil 190, as shown by the substantially straight line "A" in FIG. 3. At the same time, the strength of the magnetic attraction between the stationary magnetic member 120 and the movable magnetic member 140 substantially linearly increases in response to the increased density of the magnetic flux between the magnetic surfaces 120a and 140a, as shown by the substantially straight line "B" in FIG. 4. It is therefore to be noted that the strength of the magnetic attraction between the stationary magnetic member 120 and the movable magnetic member 140 substantially linearly increases in response to the increased level of the electric current imparted to the electromagnetic coil 190, as shown by the substantially straight line "C" in FIG. 5.

At this time, the moving distance of the movable magnetic member 140 from the second axial position of the movable magnetic member 140 substantially linearly increases in response to the increased strength of the magnetic attraction between the stationary magnetic member 120 and the movable magnetic member 140 under the influence of the disk springs 171 and 172. It is therefore to be understood that the moving distance of the movable magnetic member 140 from the second axial position of the movable magnetic member 140 substantially linearly increases in response to the increased level of the electric current imparted to the electromagnetic coil 190, as shown by the substantially straight line "D" in FIG. 6, as the movable magnetic member 140 is positioned away from the neighborhood of the first axial position of the movable magnetic member 140 and in the neighborhood of the second axial position of the movable magnetic member 140.

On the other hand, as aforesaid, the diminished cross-sectional area of the magnetic circuit unit 150 and the width of the magnetic flux gap 101 are each sized to ensure that the strength of the magnetic attraction between the stationary magnetic member 120 and the movable magnetic member 140 substantially linearly increases in response to the increased level of the electric current imparted to the electromagnetic coil 190, as shown by the substantially straight line "C" in FIG. 5, under the influence of each other as the movable magnetic member 140 is positioned in the neighborhood of the first axial position of the movable magnetic member 140.

At this time, the moving distance of the movable magnetic member 140 from the second axial position of the movable magnetic member 140 substantially linearly increases in response to the increased strength of the magnetic attraction between the stationary magnetic member 120 and the movable magnetic member 140 under the influence of the disk springs 171 and 172. It is therefore to be noted that the moving distance of the movable magnetic member 140 from the second axial position of the movable magnetic member 140 substantially linearly increases in response to the increased level of the electric current imparted to the electromagnetic coil 190, as shown by the substantially straight line "D" in FIG. 6, as the movable magnetic member 140 is positioned in the neighborhood of the first axial position of the movable magnetic member 140.

Therefore, the moving distance of the movable magnetic member 140 from the second axial position of the movable magnetic member 140 substantially linearly increases in response to the increased level of the electric current imparted to the electromagnetic coil 190, as shown by the substantially straight line "D" in FIG. 6, while the movable magnetic member 140 moves between the first and second axial positions of the movable magnetic member 140.

According to the present invention, the electric currents, which are respectively imparted to the coils 191 and 192, may be severally controlled to control the magnetic attraction. While the electromagnetic coil 190 is composed of the two coils 191 and 192 in the present preferred embodiment, the electromagnetic coil 190 may be composed of one coil or more than three coils according to the present invention.

According to the present invention, the stationary magnetic member 120, the stationary non-magnetic member 259, the movable magnetic member 140, the permanent magnet 180, and the electromagnetic coil 190 may be not in the form of an annular shape. For instance, the stationary magnetic member 120, the stationary non-magnetic member 259, the movable magnetic member 140, the permanent magnet 180, and the electromagnetic coil 190 may each consist of a plurality of parts circumferentially equally spaced apart from each other.

While the magnetic circuit unit 150 has the diminished cross-sectional area in the magnetic housing 110 in the present preferred embodiment, the magnetic circuit unit 150 may have the diminished cross-sectional area in at least one of the magnetic housing 110, the stationary magnetic member 120, and the movable magnetic member 140 according to the present invention.

The method of manufacturing the electromagnetic force motor 100 previously mentioned will be described hereinafter with reference to FIGS. 2 and 9 to 12.

Figure 9:
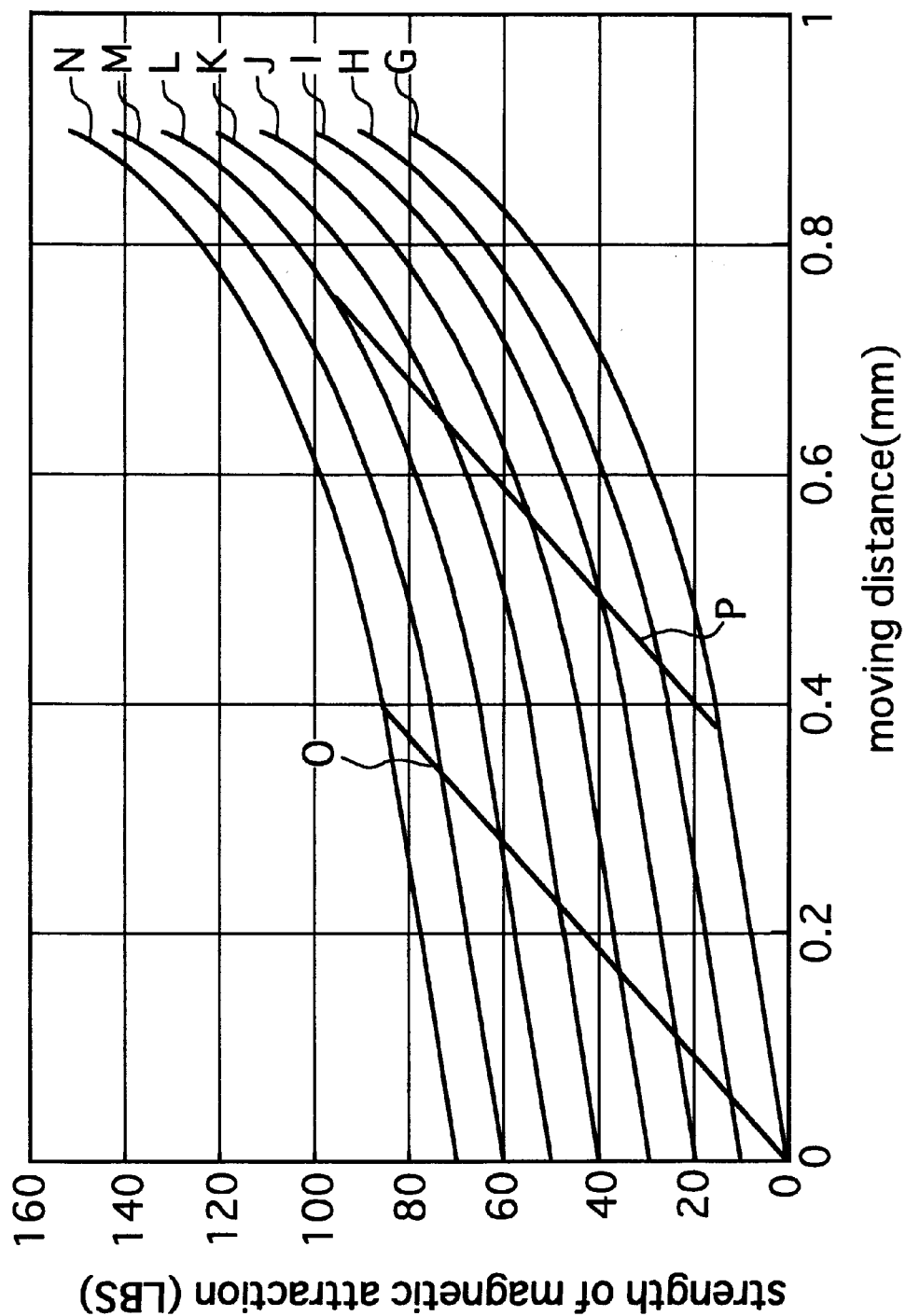
FIG. 9 is a graph showing the relation between the strength of a magnetic attraction and the moving distance for explaining a method of manufacturing the electromagnetic force motor illustrated in FIG. 2.
Figure 10:
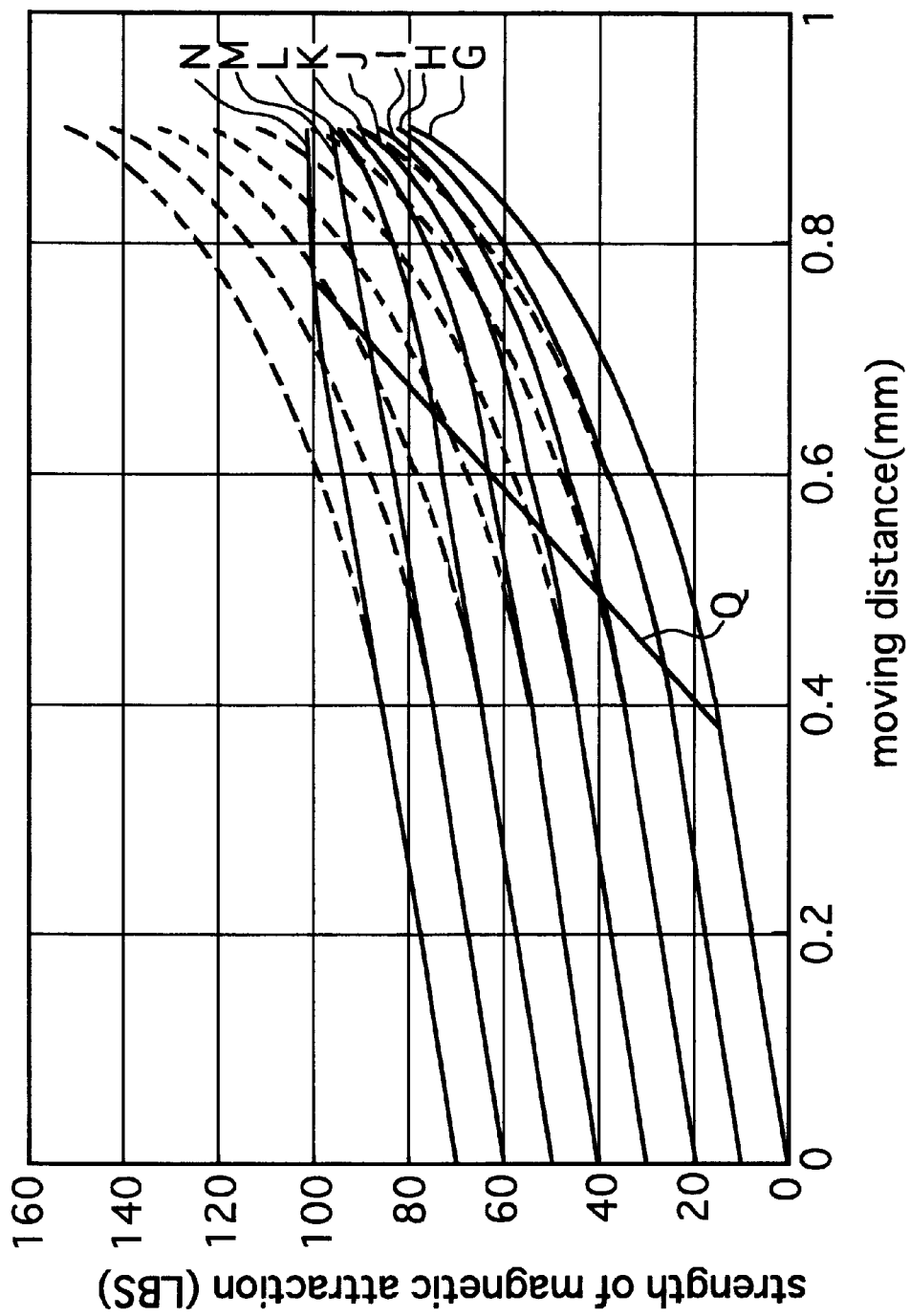
FIG. 10 is another graph showing the relation between the strength of a magnetic attraction and the moving distance for explaining a method of manufacturing the electromagnetic force motor illustrated in FIG. 2.
Figure 11:
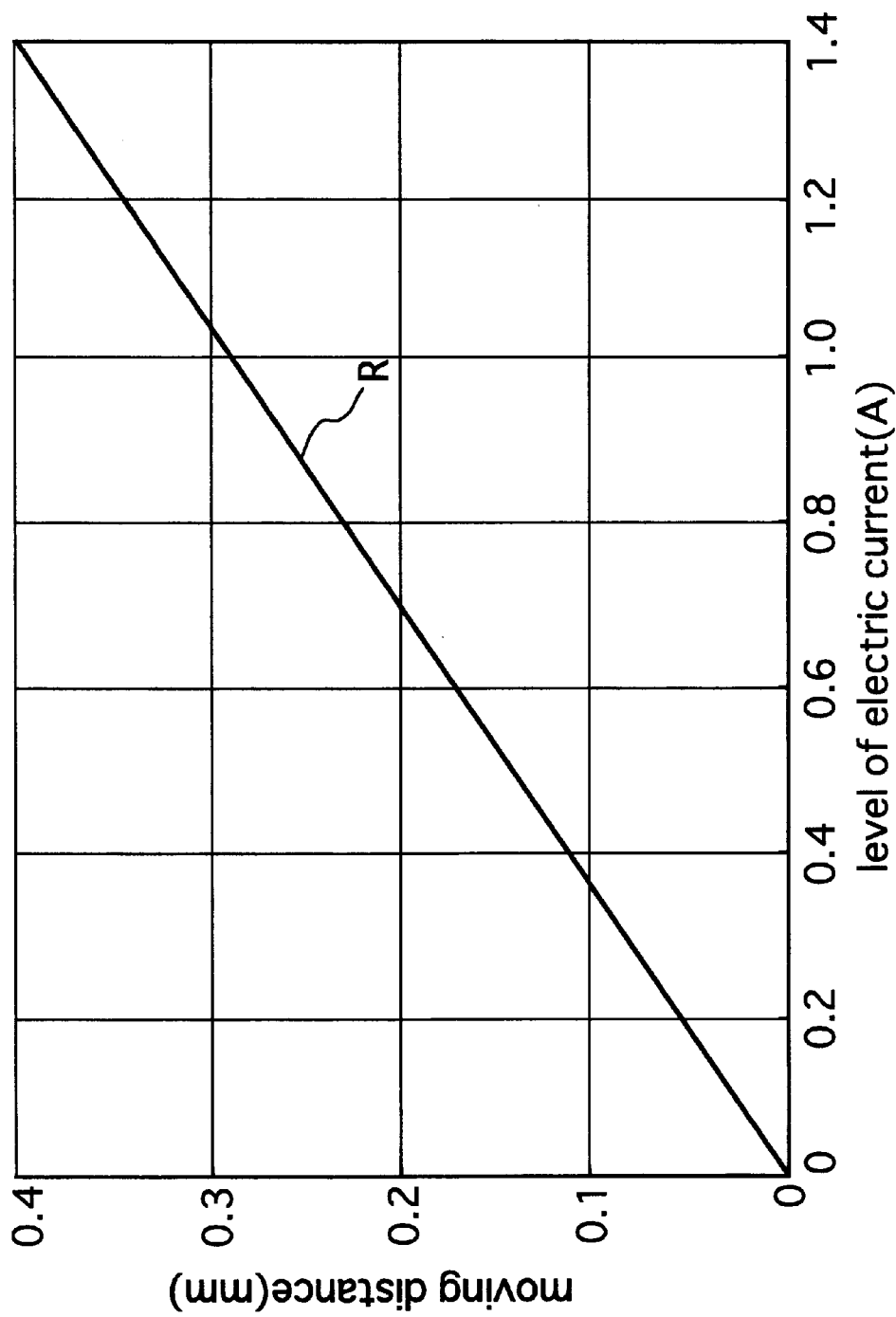
FIG. 11 is a first graph showing the relation between the moving distance and the level of an electric current for explaining a method of manufacturing the electromagnetic force motor illustrated in FIG. 2.
Figure 12:
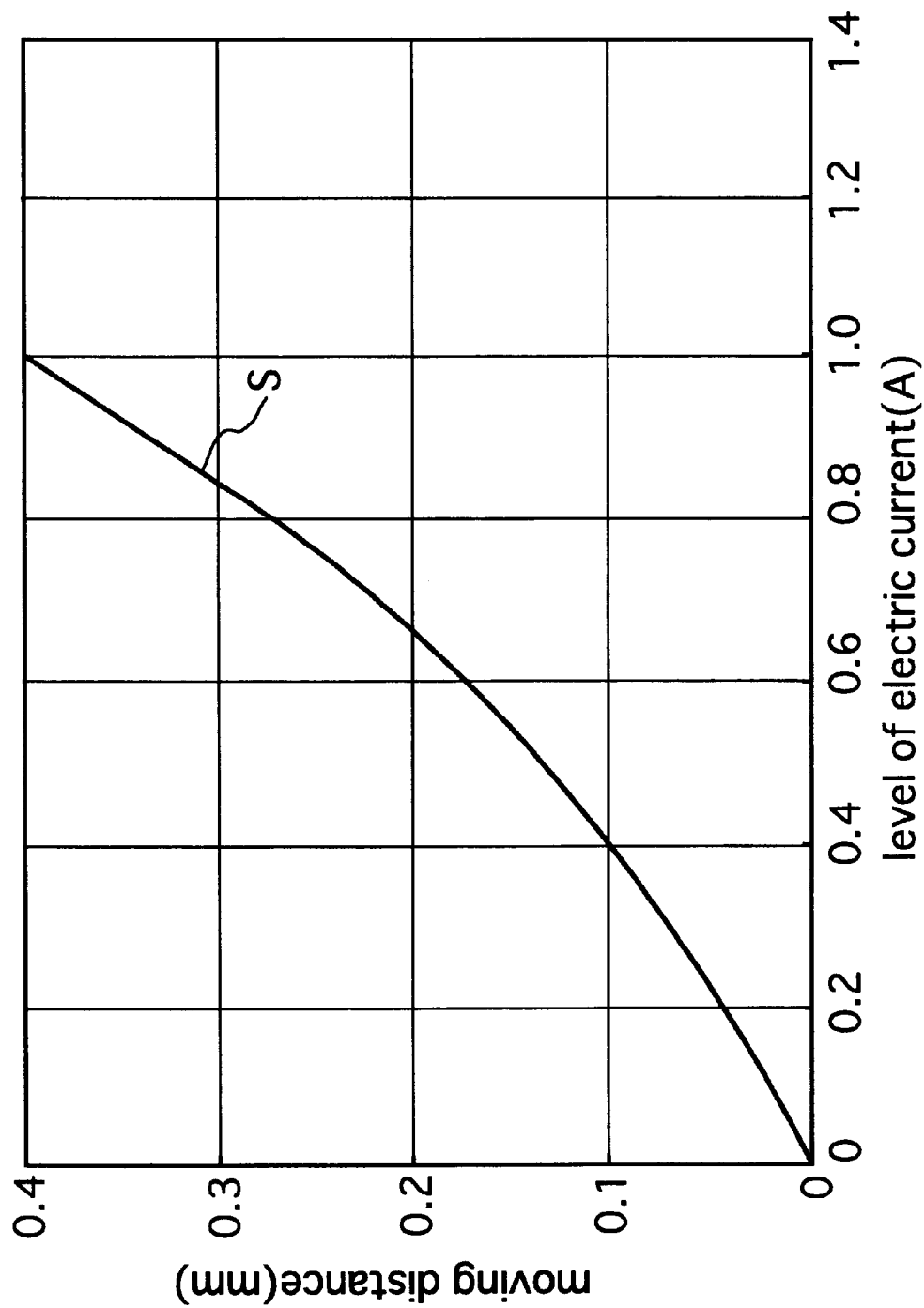
FIG. 12 is a second graph showing the relation between the moving distance and the level of an electric current for explaining a method of manufacturing the electromagnetic force motor illustrated in FIG. 2.

There are the curved lines "G", "H", "I", "J ", "K", "L", "M", and "N", which each show the strength of the magnetic attraction between the stationary magnetic member 120 and the movable magnetic member 140 against the distance between the magnetic surface 120a and the magnetic surface 140a, respectively at 0 A, 0.2 A, 0.4 A, 0.6 A, 0.8 A, 1.0 A, 1.2 A, and 1.4 A as the level of the electric current imparted to the electromagnetic coil 190, in FIGS. 9 and 10.

As there has been described in the above, the diminished cross-sectional area of the magnetic circuit unit 150 and the width of the magnetic flux gap 101 have so far been each designed to ensure that the magnetic circuit unit 150 is not saturated with the magnetic flux and that the strength of the magnetic attraction between the stationary magnetic member 120 and the movable magnetic member 140 substantially linearly increases in response to the increased density of the magnetic flux between the magnetic surfaces 120a and 140a. At this time, there is shown the strength of the magnetic attraction between the stationary magnetic member 120 and the movable magnetic member 140 against the distance between the magnetic surface 120a and the magnetic surface 140a under the influence of the disk springs 171 and 172, as shown by the substantially straight line "O" in FIG. 9. It is therefore to be understood that the moving distance of the magnetic surface 140a with respect to the magnetic surface 120a substantially linearly increases in response to the increased level of the electric current imparted to the electromagnetic coil 190, as shown by the substantially straight line "R" in FIG. 11.

According to the present invention, in the first place, the width of the magnetic flux gap 101 is designed sized to ensure that the strength of the magnetic attraction between the stationary magnetic member 120 and the movable magnetic member 140 increases with an increase rate increasing in response to the increased density of the magnetic flux between the magnetic surfaces 120a and 140a. At this time, there is shown the strength of the magnetic attraction between the stationary magnetic member 120 and the movable magnetic member 140 against the distance between the magnetic surface 120a and the magnetic surface 140a under the influence of the disk springs 171 and 172, as shown by the substantially straight line "P" in FIG. 9. It is therefore to be understood that the moving distance of the magnetic surface 140a with respect to the magnetic surface 120a non-linearly increases in response to the increased level of the electric current imparted to the electromagnetic coil 190 as shown by the curved line "S" in FIG. 12.

Figure 13:
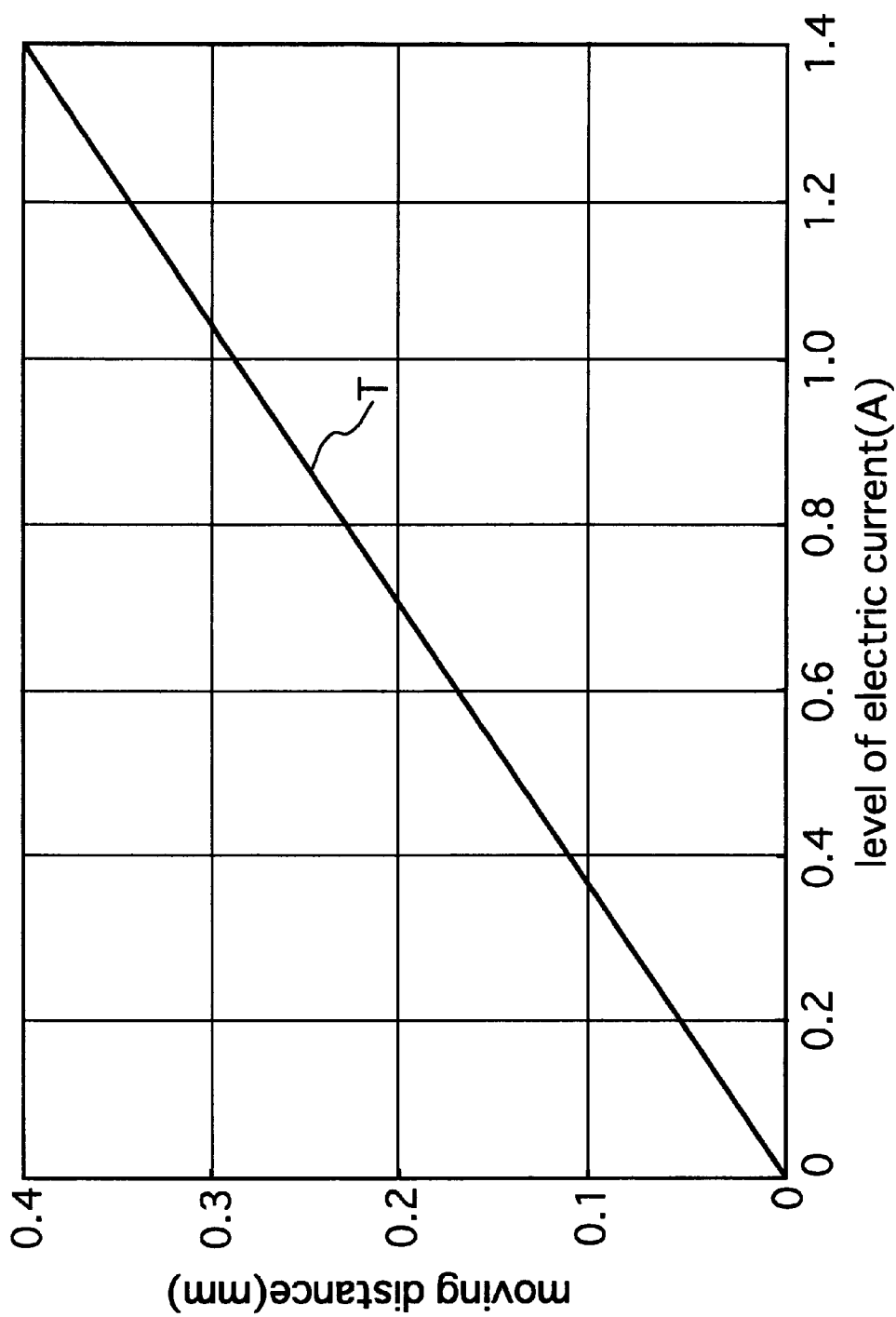
FIG. 13 is a third graph showing the relation between the moving distance and the level of an electric current for explaining a method of manufacturing the electromagnetic force motor illustrated in FIG. 2.

In the second place, the diminished cross-sectional area of the magnetic circuit unit 150 is designed sized to ensure that the magnetic circuit unit 150 is saturated with the magnetic flux. This results in the fact that the curved lines "G", "H", "I", "J", "K", "L", "M", and "N" in FIG. 9 are respectively transformed into the curved lines "G", "H", "I", "J", "K", "L", "M", and "N" in FIG. 10. At this time, there is shown the strength of the magnetic attraction between the stationary magnetic member 120 and the movable magnetic member 140 against the distance between the magnetic surface 120a and the magnetic surface 140a under the influence of the disk springs 171 and 172, as shown by the substantially straight line "Q" in FIG. 10. It is therefore to be understood that the moving distance of the magnetic surface 140a with respect to the magnetic surface 120a substantially-linearly increases in response to the increased level of the electric current imparted to the electromagnetic coil 190 as shown by the substantially straight line "I" in FIG. 13.

While the diminished cross-sectional area of the magnetic circuit unit 150 is designed after the width of the magnetic flux gap 101 is designed in the present preferred embodiment, the diminished cross-sectional area of the magnetic circuit unit 150 may be designed before the width of the magnetic flux gap 101 is designed in the present preferred embodiment according to the present invention.

Figure 14:
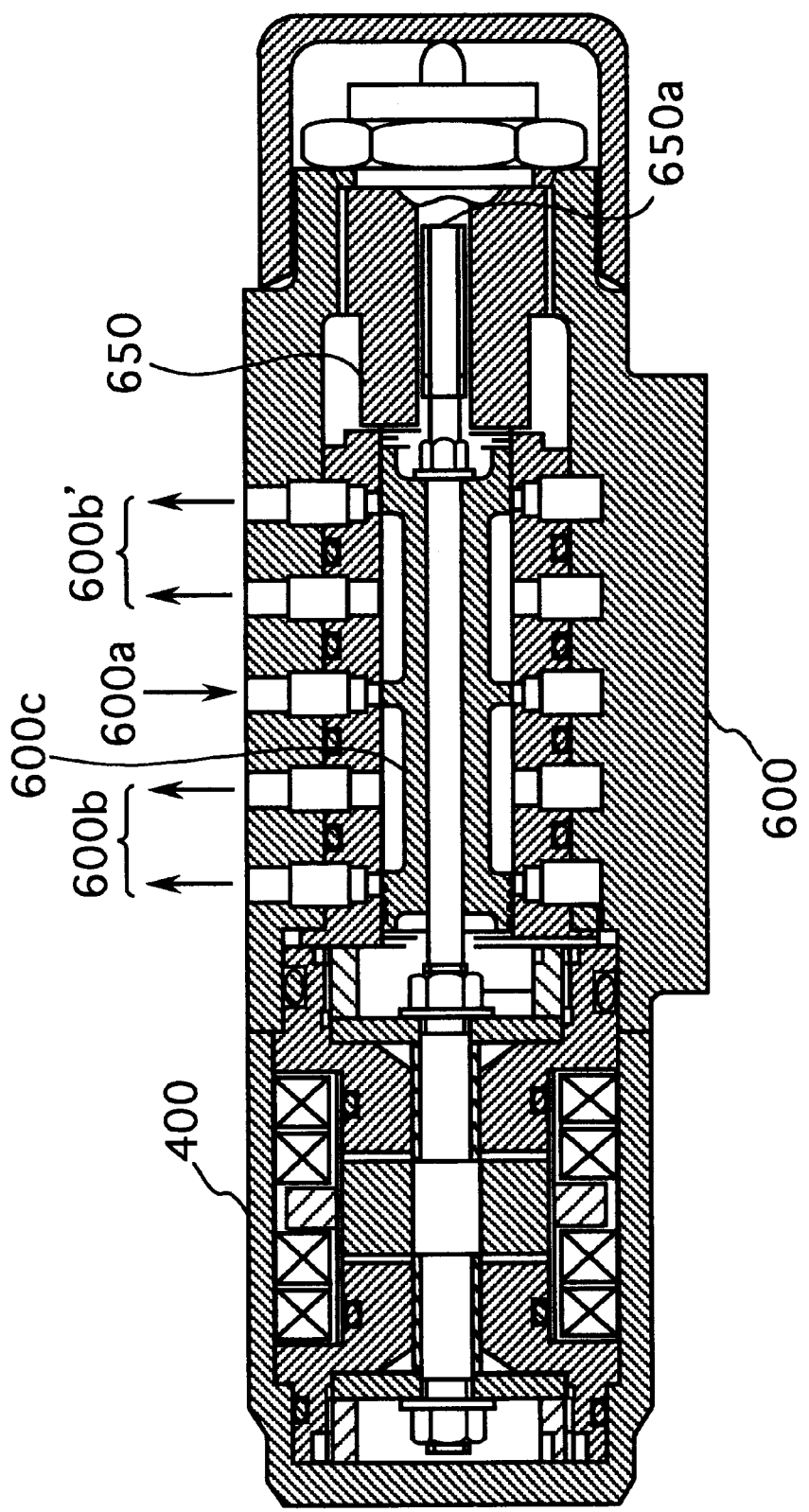
FIG. 14 is a cross-sectional view of a second preferred embodiment of an electromagnetic force motor according to the present invention.
Figure 15:
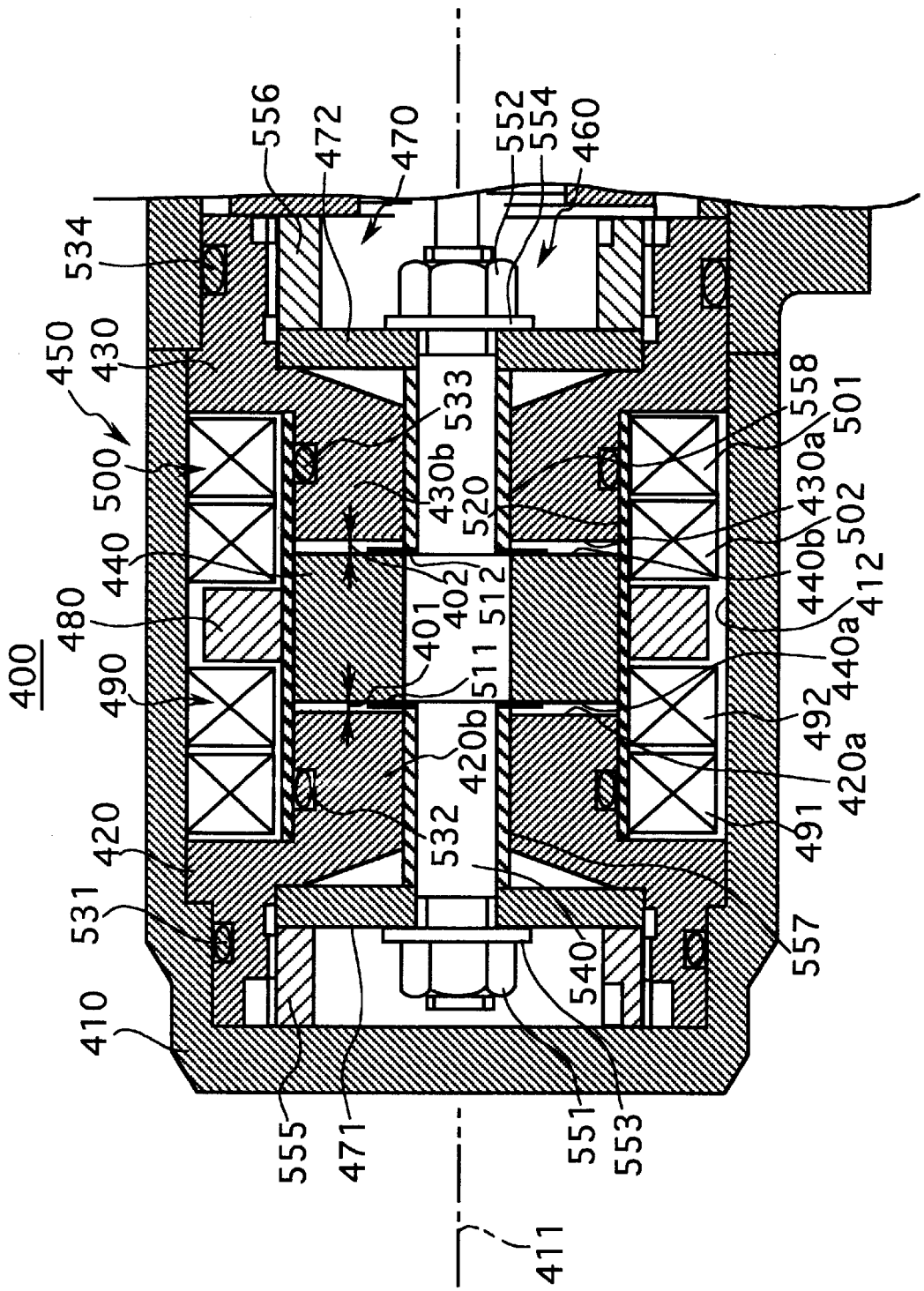
FIG. 15 is a fragmentary cross-sectional view of the electromagnetic force motor illustrated in FIG. 14.
Figure 16:
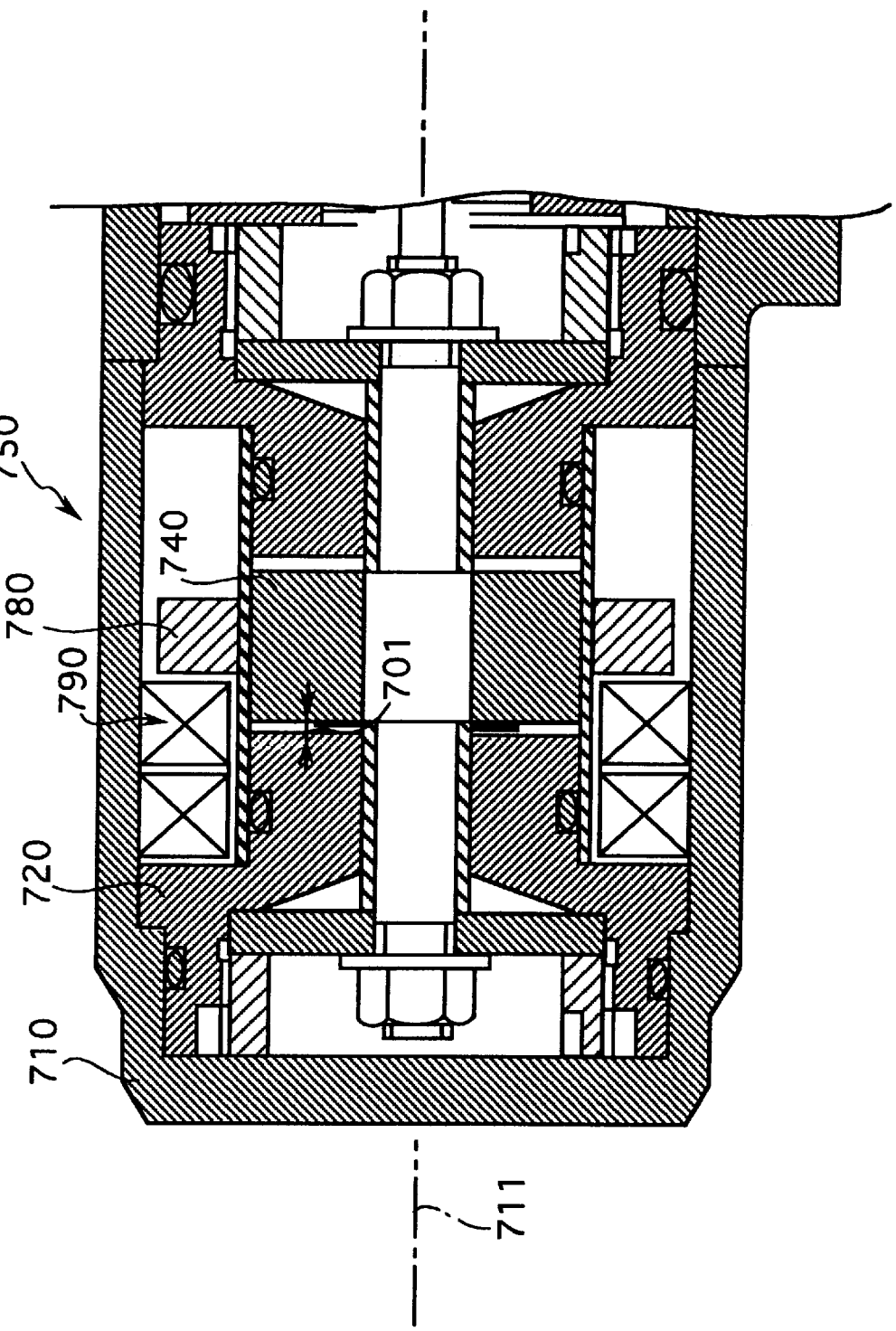
FIG. 16 is a cross-sectional view of a conventional electromagnetic force motor.
Figure 17:
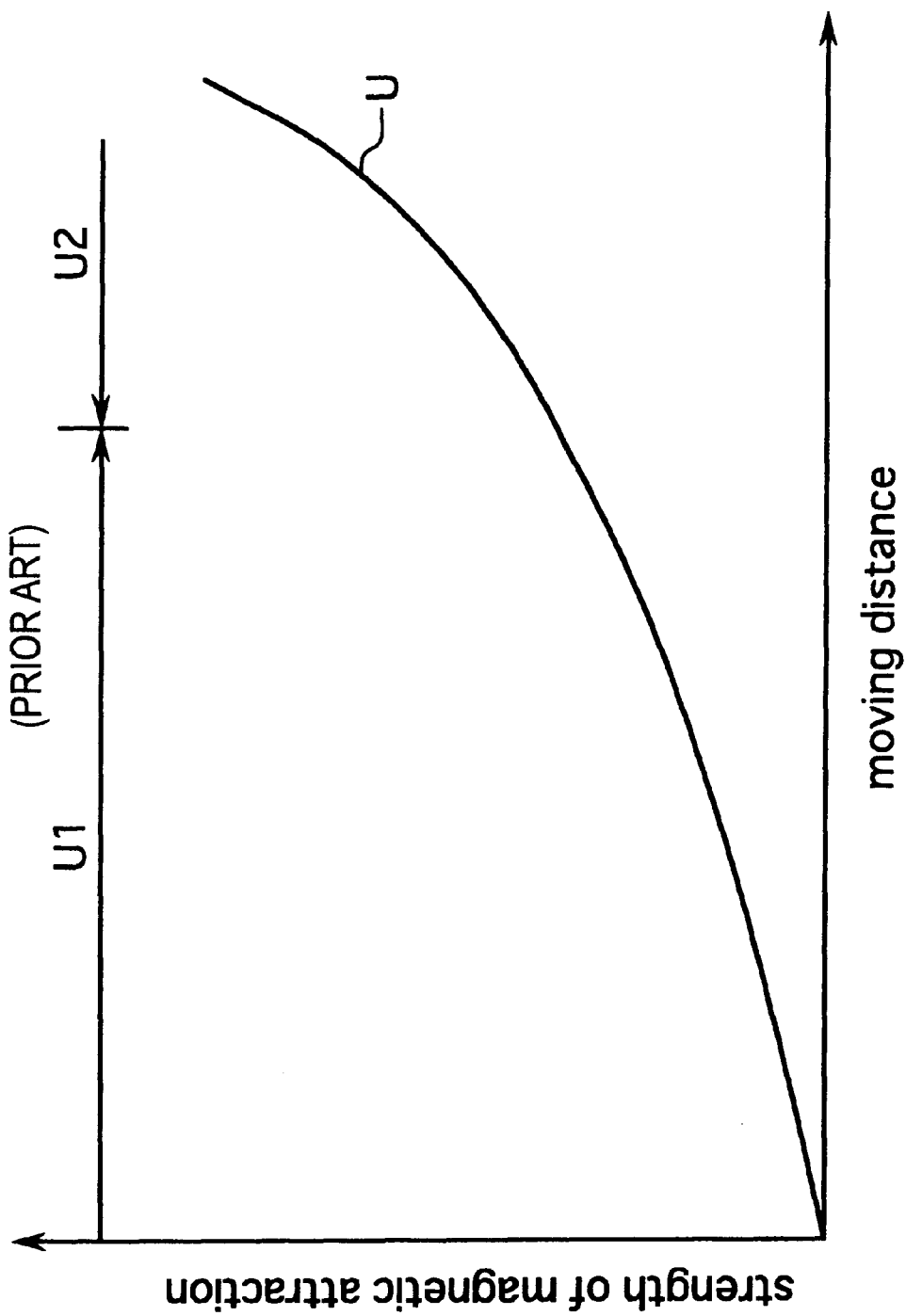
FIG. 17 is a graph showing the relation between the strength of a magnetic attraction and the moving distance for explaining the electromagnetic force motor illustrated in FIG. 16.
Figure 18:
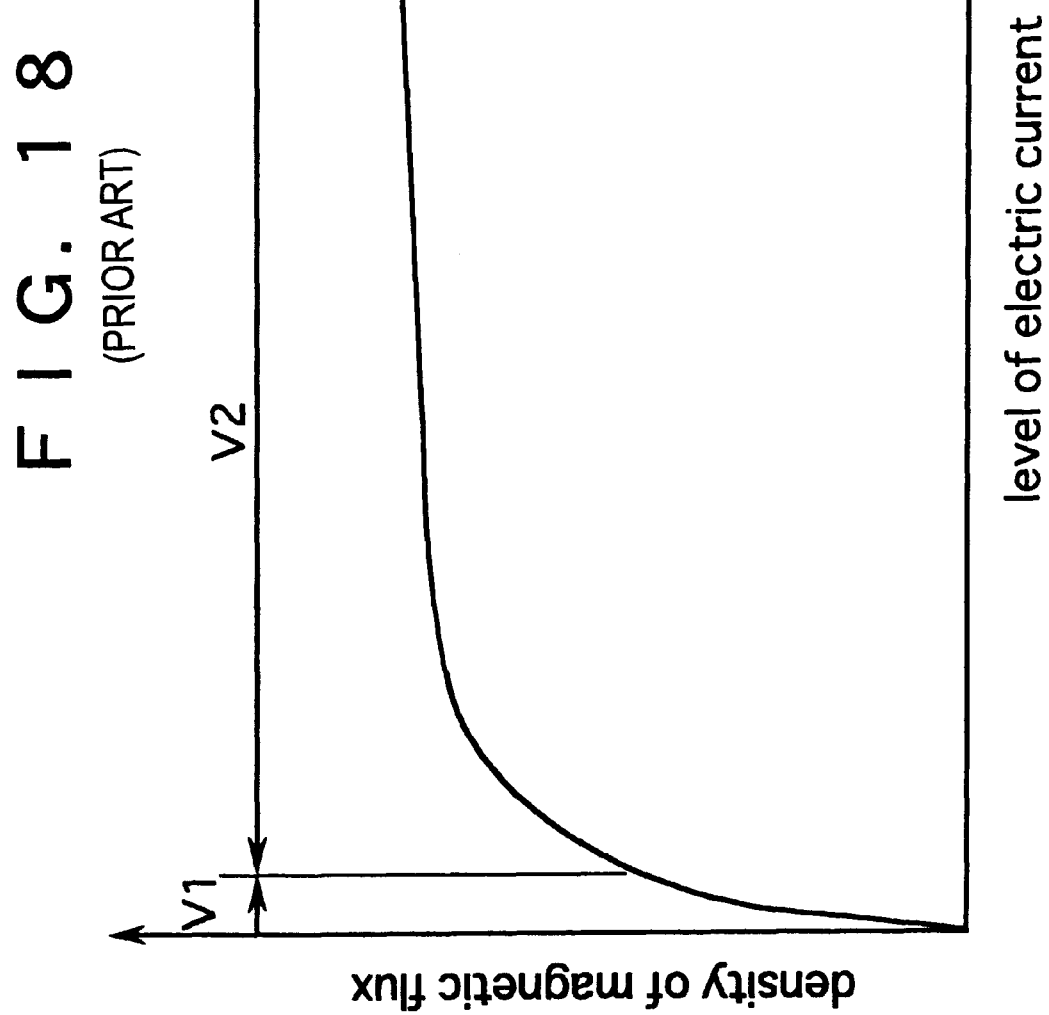
FIG. 18 is a graph showing the relation between the density of a magnetic flux and the level of an electric current for explaining the electromagnetic force motor illustrated in FIG. 16.

Referring to FIGS. 14 and 15 of the drawings, there is shown a second preferred embodiment of the electromagnetic force motor according to the present invention. The electromagnetic force motor 400 forms part of a direct operated solenoid servo valve comprising a control valve 600 for controlling a hydraulic cylinder (not shown), in FIG. 14. The control valve 600 comprises an input port 600a for permitting oil to be inputted into the control valve 600, output and drain ports 600b and 600b' for permitting oil to be outputted out of the control valve 600, and a spool 600c for permitting the input port 600a to be held in communication with at least one of the output and drain ports 600b and 600b'. The spool 600c is connected to and controlled by the electromagnetic force motor 400. The direct operated solenoid servo valve further comprises a differential transformer 650 comprising a movable iron rod 650a connected to the spool 600c and detecting the displacement of the spool 600c to generate an electric signal in response to the detected displacement of the spool 600c. The electric signal generated by the differential transformer 650 is used to control the electromagnetic force motor 400 with more precision by well-known means.

The electromagnetic force motor 400 is shown in FIG. 15 as comprising a magnetic housing 410 made of a magnetic substance and having an axis 411. The magnetic housing 410 is in the form of a cylindrical hollow shape to have a housing chamber 412 formed therein.

The electromagnetic force motor 400 further comprises first and second stationary magnetic members 420 and 430 each made of a magnetic substance and each in the form of an annular shape. The first and second stationary magnetic members 420 and 430 are each received in the housing chamber 412 in coaxial relationship with the magnetic housing 410 in stationary relationship with respect to the magnetic housing 410 in such a manner that the first and second stationary magnetic members 420 and 430 are each fixed on the magnetic housing 410. The first and second stationary magnetic members 420 and 430 respectively have magnetic flux surfaces 420a and 430a each substantially perpendicularly extending to the axis 411 of the magnetic housing 410 to permit a magnetic flux to pass therethrough.

The electromagnetic force motor 400 further comprises a movable magnetic member 440 made of a magnetic substance and in the form of an annular shape. The movable magnetic member 440 is received in the housing chamber 412 in coaxial relationship with the magnetic housing 410 to be movable with respect to the magnetic housing 410 along the axis 411 of the magnetic housing 410 to assume first, second, and third axial positions axially spaced apart from each other. The first axial position of the movable magnetic member 440 is closer to the first stationary magnetic member 420 than the third axial position of the movable magnetic member 440. The third axial position of the movable magnetic member 440 is closer to the second stationary magnetic member 430 than the first axial position of the movable magnetic member 440. The second axial position of the movable magnetic member 440 is between the first and third axial positions of the movable magnetic member 440. The movable magnetic member 440 has a first magnetic flux surface 440a substantially perpendicularly extending to the axis 411 of the magnetic housing 410 to be held in face-to-face relationship with the magnetic flux surface 420a of the first stationary magnetic member 420 with a first magnetic flux gap 401 to permit a magnetic flux to pass therethrough. The movable magnetic member 440 further has a second magnetic flux surface 440b substantially perpendicularly extending to the axis 411 of the magnetic housing 410 to be held in face-to-face relationship with the magnetic flux surface 430a of the second stationary magnetic member 430 with a second magnetic flux gap 402 to permit a magnetic flux to pass therethrough.

The magnetic housing 410, the first and second stationary magnetic members 420 and 430, and the movable magnetic member 440 collectively form a magnetic circuit unit 450 that is to allow a magnetic flux to pass therethrough.

The electromagnetic force motor 400 further comprises support means 460 for supporting the movable magnetic member 440 to ensure that the movable magnetic member 440 is movable along the axis 411 of the magnetic housing 410 to assume the first, second, and third axial positions of the movable magnetic member 440.

The support means 460 is composed of a movable rod 540 made of a non-magnetic substance and being in coaxial relationship with the magnetic housing 410. The movable rod 540 has a longitudinally center portion and first and second longitudinally end portions. The movable rod 540 is integrally formed with the movable magnetic member 440 in such a manner that the longitudinally center portion of the movable rod 540 is inserted into and fixed to the movable magnetic member 440. The first longitudinally end portion is closer to the first stationary magnetic member 420 than the second longitudinally end portion. The second longitudinally end portion is closer to the second stationary magnetic member 430 than the first longitudinally end portion. The movable rod 540 is integrally formed with the spool 600c under the state that the movable rod 540 and the spool 600c are in axial alignment with each other (see FIG. 14).

Referring back to FIG. 15, the support means 460 is further composed of first and second non-magnetic stoppers 511 and 512 each in the form of an annular shape and each made of a non-magnetic substance. The first and second non-magnetic stoppers 511 and 512 are positioned in the housing chamber 412 in coaxial relationship with the magnetic housing 410 under the state that the movable rod 540 is inserted into the first and second non-magnetic stoppers 511 and 512, and the first and second non-magnetic stoppers 511 and 512 are each contacted with the movable magnetic member 440 respectively on the first and second magnetic surfaces 440a and 440b. The first non-magnetic stopper 511 is positioned between the first stationary magnetic member 420 and the movable magnetic member 440 to prevent the first stationary magnetic member 420 and the movable magnetic member 440 from being adhered to each other. The second non-magnetic stopper 512 positioned between the second stationary magnetic member 430 and the movable magnetic member 440 to prevent the second stationary magnetic member 430 and the movable magnetic member 440 from being adhered to each other.

The support means 460 is further composed of first and second non-magnetic sleeves 557 and 558 each made of a non-magnetic substance and permitting the movable rod 540 to be inserted thereinto under the state that the first and second non-magnetic sleeves 557 and 558 is respectively contacted with the first and second non-magnetic stoppers 511 and 512. The first non-magnetic sleeve 557 is positioned in the first stationary magnetic member 420 with an annular gap between the outer surface of the first non-magnetic sleeve 557 and the inner surface of the first stationary magnetic member 420. The annular gap between the outer surface of the first non-magnetic sleeve 557 and the inner surface of the first stationary magnetic member 420 is sized to ensure that the first non-magnetic sleeve 557 can axially move with respect to the first stationary magnetic member 420. In similar manner, the second non-magnetic sleeve 558 is positioned in the second stationary magnetic member 430 with an annular gap between the outer surface of the second non-magnetic sleeve 558 and the inner surface of the second stationary magnetic member 430. The annular gap between the outer surface of the second non-magnetic sleeve 558 and the inner surface of the second stationary magnetic member 430 is sized to ensure that the second non-magnetic sleeve 558 can axially move with respect to the second stationary magnetic member 430.

The support means 460 is further composed of first and second disk springs 471 and 472 each with a plurality of holes drilled therein in spiral relationship with each other and each made of a steal. The first and second disk springs 471 and 472 each permit the movable rod 540 to be inserted thereinto. The first and second disk springs 471 and 472 each have a radially inward portion. The radially inward portions of the first and second disk springs 471 and 472 are respectively fixed to the first and second non-magnetic sleeves 557 and 558 respectively by the washer 553 and the nut 551 permitting the first longitudinally end portion of the movable rod 540 to be screwed thereinto, and the washer 554 and the nut 552 permitting the second longitudinally end portion of the movable rod 540 to be screwed thereinto. The first and second disk springs 471 and 472 each have a radially outward portion. The radially outward portions of the first and second disk springs 471 and 472 are respectively fixed to the first and second stationary magnetic members 420 and 430 respectively by nuts 555 and 556.

The support means 460 is further composed of the first and second stationary magnetic members 420 and 430 each held in stationary relationship with respect to the magnetic housing 410.

The electromagnetic force motor 400 further comprises biasing means 470 for axially resiliently biasing the movable magnetic member 440 toward the second axial position of the movable magnetic member 440. The biasing means 470 is composed of the first and second disk springs 471 and 472.

The electromagnetic force motor 400 further comprises a permanent magnet 480 in the form of an annular shape. The permanent magnet 480 is positioned in the housing chamber 412 in coaxial relationship with the magnetic housing 410 and radially between the magnetic housing 410 and the movable magnetic member 440 to generate a magnetic flux. The magnetic flux generated by the permanent magnet 480 has a first magnetic flux flow to circulate through the permanent magnet 480, the movable magnetic member 440, the first stationary magnetic member 420, and the magnetic housing 410, and a second magnetic flux flow to circulate through the permanent magnet 480, the movable magnetic member 440, the second stationary magnetic member 430, and the magnetic housing 410. The first and second magnetic flux flows are substantially equal in density to each other.

The electromagnetic force motor 400 further comprises a first electromagnetic coil 490 in the form of an annular shape. The first electromagnetic coil 490 is positioned between the first stationary magnetic member 420 and the permanent magnet 480 in the housing chamber 412 in axial alignment with the first stationary magnetic member 420 and the permanent magnet 480 to generate a magnetic flux with an electric current imparted thereto. The first electromagnetic coil 490 is composed of two coils 491 and 492 each fixed to the magnetic housing 410. The coils 491 and 492 are in electrically parallel relationship with each other and each comprise a wire small in diameter enough to ensure that the first electromagnetic coil 490 is small in diameter enough to be received in the housing chamber 412.

On the other hand, the first stationary magnetic member 420 has an axial portion 420b. The first electromagnetic coil 490 is positioned radially outwardly of the axial portion 420b of the first stationary magnetic member 420.

The electromagnetic force motor 400 further comprises a second electromagnetic coil 500 in the form of an annular shape. The second electromagnetic coil 500 is positioned between the second stationary magnetic member 430 and the permanent magnet 480 in the housing chamber 412 in axial alignment with the second stationary magnetic member 430 and the permanent magnet 480 to generate a magnetic flux with an electric current imparted thereto. The second electromagnetic coil 500 is composed of two coils 501 and 502 each fixed to the magnetic housing 410. The coils 501 and 502 are in electrically parallel relationship with each other and each comprise a wire small in diameter enough to ensure that the second electromagnetic coil 500 is small in diameter enough to be received in the housing chamber 412.

On the other hand, the second stationary magnetic member 430 has an axial portion 430b. The second electromagnetic coil 500 is positioned radially outwardly of the axial portion 430b of the second stationary magnetic member 430.

The electromagnetic force motor 400 further comprises a non-magnetic member 520 in the form of an annular shape and made of a non-magnetic substance. The non-magnetic member 520 is positioned in the housing chamber 412 in coaxial relationship with the magnetic housing 410. The non-magnetic member 520 is positioned radially outwardly of the movable magnetic member 440 with a gap between the inner surface of the non-magnetic member 520 and the outer surface of the movable magnetic member 440, and radially inwardly of the permanent magnet 480 and the first and second electromagnetic coils 490 and 500. The non-magnetic member 520 is fixed on the first and second stationary magnetic members 420 and 430 and permits the permanent magnet 480 to be fixed thereon. The magnetic housing 410, the first and second stationary magnetic members 420 and 430, and the non-magnetic member 520 collectively tightly enclose the first and second electromagnetic coils 490 and 500 and the permanent magnet 480. The gap between the inner surface of the non-magnetic member 520 and the outer surface of the movable magnetic member 440 is sized to ensure that the movable magnetic member 440 can axially move with respect to the non-magnetic member 520.

The electromagnetic force motor 400.further comprises four oil seals 531, 532, 533, and 534. The oil seal 531 seals the gap between the magnetic housing 410 and the first stationary magnetic member 420. The oil seal 532 seals the gap between the non-magnetic member 520 and the first stationary magnetic member 420. The oil seal 533 seals the gap between the second stationary magnetic member 430 and the non-magnetic member 520. The oil seal 534 seals the gap between the magnetic housing 410 and the second stationary magnetic member 430.

The oil seals 531, 532, 533, and 534, the magnetic housing 410, the first and second stationary magnetic members 420 and 430, and the non-magnetic member 520 collectively prevent the first and second electromagnetic coils 490 and 500 and the permanent magnet 480 from being exposed to the oil escaping from the control valve 600 (see FIG. 14).

Referring back to FIG. 15, the magnetic circuit unit 450 partly, according to the present preferred embodiment in the magnetic housing 410, has a diminished cross-sectional area sized to ensure that the magnetic circuit unit 450 is saturated with the magnetic flux as the movable magnetic member 440 is positioned in the neighborhood of the first axial position of the movable magnetic member 440. Explaining in detail, the diminished cross-sectional area is sized to ensure that the density of the magnetic flux flowing between the magnetic surface 420a and the first magnetic surface 440a increases in response to the increased level of the electric current imparted to at least one of the first and second electromagnetic coils 490 and 500 with an increase rate decreasing, as shown by the curved line "E" in FIG. 7, as the movable magnetic member 440 is positioned in the neighborhood of the first axial position of the movable magnetic member 440.

The width of the first magnetic flux gap 401 is sized to ensure that the strength of the magnetic attraction between the first stationary magnetic member 420 and the movable magnetic member 440 increases in response to the increased density of the magnetic flux flowing between the magnetic surface 420a and the first magnetic surface 440a with an increase rate increasing, as shown by the curved line "F" in FIG. 8, as the movable magnetic member 440 is positioned in the neighborhood of the first axial position of the movable magnetic member 440.

Further, the diminished cross-sectional area of the magnetic circuit unit 450 and the width of the first magnetic flux gap 401 are each sized to ensure that the strength of the magnetic attraction between the first stationary magnetic member 420 and the movable magnetic member 440 substantially linearly increases in response to the increased level of the electric current imparted to at least one of the first and second electromagnetic coils 490 and 500, as shown by the substantially straight line "C" in FIG. 5, under the influence of each of the diminished cross-sectional area of the magnetic circuit unit 450 and the width of the first magnetic flux gap 401.

In similar manner, the diminished cross-sectional area is sized to ensure that the magnetic circuit unit 450 is saturated with the magnetic flux as the movable magnetic member 440 is positioned in the neighborhood of the third axial position of the movable magnetic member 440. Explaining in detail, the diminished cross-sectional area is sized to ensure that the density of the magnetic flux flowing between the magnetic surface 430a and the second magnetic surface 440b increases in response to the increased level of the electric current imparted to at least one of the first and second electromagnetic coils 490 and 500 with an increase rate decreasing, as shown by the curved line "E" in FIG. 7, as the movable magnetic member 440 is positioned in the neighborhood of the third axial position of the movable magnetic member 440.

The width of the second magnetic flux gap 402 is sized to ensure that the strength of the magnetic attraction between the second stationary magnetic member 430 and the movable magnetic member 440 increases in response to the increased density of the magnetic flux flowing between the magnetic surface 430a and the second magnetic surface 440b with an increase rate increasing, as shown by the curved line "F" in FIG. 8, as the movable magnetic member 440 is positioned in the neighborhood of the third axial position of the movable magnetic member 440.

Further, the diminished cross-sectional area of the magnetic circuit unit 450 and the width of the second magnetic flux gap 402 are each sized to ensure that the strength of the magnetic attraction between the second stationary magnetic member 430 and the movable magnetic member 440 substantially linearly increases in response to the increased level of the electric current imparted to at least one of the first and second electromagnetic coils 490 and 500, as shown by the substantially straight line "C" in FIG. 5, under the influence of each of the diminished cross-sectional area of the magnetic circuit unit 450 and the width of the second magnetic flux gap 402.

Needless to say, the case that the movable magnetic member 440 is positioned in the neighborhood of the first axial position of the movable magnetic member 440 is different in direction of the electric current imparted to the first and second electromagnetic coils 490 and 500 from the case that the movable magnetic member 440 is positioned in the neighborhood of the third axial position of the movable magnetic member 440.

The operation of the electromagnetic force motor 400 previously mentioned will be described hereinafter with reference to FIG. 15.

When the electric current is not imparted to the first and second magnetic coils 490 and 500, the first and second magnetic flux flows are generated by the permanent magnet 480 and equal in density to each other in the magnetic circuit unit 450. This results in the fact that the movable magnetic member 440 is positioned in the second axial position of the movable magnetic member 440.

When the electric current is imparted to at least one of the first and second magnetic coils 490 and 500 to ensure that the magnetic flux generated by the first and second magnetic coils 490 and 500 flows from the second stationary magnetic member 430 through the movable magnetic member 440 to the first stationary magnetic member 420, the strength of the magnetic attraction between the first stationary magnetic member 420 and the movable magnetic member 440 increases in response to the increased density of the magnetic flux flowing from the movable magnetic member 440 through the first magnetic surface 440a and the magnetic surface 420a to the first stationary magnetic member 420. At this time, the movable magnetic member 440 moves toward the first axial position of the movable magnetic member 440 to the position where the magnetic attraction between the first stationary magnetic member 420 and the movable magnetic member 440 is equal in strength to the elastic force generated by the both the disk springs 471 and 472.

As the movable magnetic member 440 is positioned away from the neighborhood of the first axial position of the movable magnetic member 440 and in the neighborhood of the second axial position of the movable magnetic member 440, the magnetic circuit unit 450 is not saturated with the magnetic flux. Explaining in detail, the density of the magnetic flux flowing between the first magnetic surface 440a and the magnetic surface 420a substantially linearly increases in response to the increased level of the electric current imparted to at least one of the first and second electromagnetic coils 490 and 500, as shown by the substantially straight line "A" in FIG. 3. At the same time, the strength of the magnetic attraction between the first stationary magnetic member 420 and the movable magnetic member 440 substantially linearly increases in response to the increased density of the magnetic flux between the first magnetic surface 440a and the magnetic surface 420a, as shown by the substantially straight line "B" in FIG. 4. It is therefore to be noted that the strength of the magnetic attraction between the first stationary magnetic member 420 and the movable magnetic member 440 substantially linearly increases in response to the increased level of the electric current imparted to at least one of the first and second electromagnetic coils 490 and 500, as shown by the substantially straight line "C" in FIG. 5.

At this time, the moving distance of the movable magnetic member 440 from the second axial position of the movable magnetic member 440 substantially linearly increases in response to the increased strength of the magnetic attraction between the first stationary magnetic member 420 and the movable magnetic member 440 under the influence of the disk springs 471 and 472. It is therefore to be understood that the moving distance of the movable magnetic member 440 from the second axial position of the movable magnetic member 440 substantially linearly increases in response to the increased level of the electric current imparted to at least one of the first and second electromagnetic coils 490 and 500, as shown by the substantially straight line "D" in FIG. 6, as the movable magnetic member 440 is positioned away from the neighborhood of the first axial position of the movable magnetic member 440 and in the neighborhood of the second axial position of the movable magnetic member 440.

On the other hand, as aforesaid, the diminished cross-sectional area of the magnetic circuit unit 450 and the width of the first magnetic flux gap 401 are sized enough to ensure that the strength of the magnetic attraction between the first stationary magnetic member 420 and the movable magnetic member 440 substantially linearly increases in response to the increased level of the electric current imparted to at least one of the first and second electromagnetic coils 490 and 500, as shown by the substantially straight line "C" in FIG. 5, under the influence of each other as the movable magnetic member 440 is positioned in the neighborhood of the first axial position of the movable magnetic member 440.

At this time, the moving distance of the movable magnetic member 440 from the second axial position of the movable magnetic member 440 substantially linearly increases in response to the increased strength of the magnetic attraction between the first stationary magnetic member 420 and the movable magnetic member 440 under the influence of the disk springs 471 and 472. It is therefore to be noted that the moving distance of the movable magnetic member 440 from the second axial position of the movable magnetic member 440 substantially linearly increases in response to the increased level of the electric current imparted to at least one of the first and second electromagnetic coils 490 and 500, as shown by the substantially straight line "D" in FIG. 6, as the movable magnetic member 440 is positioned in the neighborhood of the first axial position of the movable magnetic member 440.

Therefore, the moving distance of the movable magnetic member 440 from the second axial position of the movable magnetic member 440 substantially linearly increases in response to the increased level of the electric current imparted to at least one of the first and second electromagnetic coils 490 and 500, as shown by the substantially straight line "D" in FIG. 6, while the movable magnetic member 440 moves between the first and second axial positions of the movable magnetic member 440.

When the electric current is imparted to at least one of the first and second magnetic coils 490 and 500 to ensure that the magnetic flux generated by the first and second magnetic coils 490 and 500 flows from the first stationary magnetic member 420 through the movable magnetic member 440 to the second stationary magnetic member 430, the strength of the magnetic attraction between the second stationary magnetic member 430 and the movable magnetic member 440 increases in response to the increased density of the magnetic flux flowing from the movable magnetic member 440 through the second magnetic surface 440b and the magnetic surface 430a to the second stationary magnetic member 430. At this time, the movable magnetic member 440 moves toward the third axial position of the movable magnetic member 440 to the position where the magnetic attraction between the second stationary magnetic member 430 and the movable magnetic member 440 is equal in strength to the elastic force of the both the disk springs 471 and 472.

In similar manner to the case that the movable magnetic member 440 moves toward the first axial position of the movable magnetic member 440, the moving distance of the movable magnetic member 440 from the second axial position of the movable magnetic member 440 substantially linearly increases in response to the increased level of the electric current imparted to at least one of the first and second electromagnetic coils 490 and 500 as the movable magnetic member 440 moves between the second and third axial positions of the movable magnetic member 440.

According to the present invention, the electric currents, which are respectively imparted to the coils 491, 492, 501, and 502 may be severally controlled to control the magnetic attraction. While the electromagnetic coils 490 and 500 is respectively composed of the two coils 491 and 492 and the two coils 501 and 502 in the present preferred embodiment, the electromagnetic coils 490 and 500 may be each composed of one coil or more than three coils according to the present invention.

According to the present invention, the first and second stationary magnetic members 420 and 430, the movable magnetic member 440, the permanent magnet 480, and the first and second electromagnetic coils 490 and 500 may be not in the form of an annular shape, For instance, the first and second stationary magnetic members 420 and 430, the movable magnetic member 440, the permanent magnet 480, and the first and second electromagnetic coils 490 and 500 may each consist of a plurality of parts circumferentially equally spaced apart from each other.

While the magnetic circuit unit 450 has the diminished cross-sectional area in the magnetic housing 410 in the present preferred embodiment, the magnetic circuit unit 450 may have the diminished cross-sectional area in at least one of the magnetic housing 410, the first stationary magnetic member 420, the second stationary magnetic member 430, and the movable magnetic member 440 according to the present invention.

The method of manufacturing the electromagnetic force motor 400 previously mentioned is similar to the method of manufacturing the electromagnetic force motor 100 mentioned in the first preferred embodiment.

While the present invention has thus been shown and described with reference to the specific embodiments, however, it should be noted that the invention is not limited to the details of the illustrated structures but changes and modifications may be made without departing from the scope of the appended claims.

What is claimed is:

1. An electromagnetic force motor comprising:

a magnetic housing made of a magnetic substance and having an axis, the magnetic housing being in the form of a cylindrical hollow shape to have a housing chamber formed therein;

a stationary magnetic member made of a magnetic substance and received in the housing chamber in stationary relationship with respect to the magnetic housing, the stationary magnetic member having a magnetic flux surface substantially perpendicularly extending to the axis of the magnetic housing to permit a magnetic flux to pass therethrough;

a movable magnetic member made of a magnetic substance and received in the housing chamber to be movable with respect to the magnetic housing along the axis of the magnetic housing to assume first and second axial positions axially spaced apart from each other, the first axial position of the movable magnetic member being closer to the stationary magnetic member than the second axial position of the movable magnetic member, the movable magnetic member having a magnetic flux surface substantially perpendicularly extending to the axis of the magnetic housing to be held in face-to-face relationship with the magnetic flux surface of the stationary magnetic member with a magnetic flux gap to permit a magnetic flux to pass therethrough, the magnetic housing, the stationary magnetic member, and the movable magnetic member collectively forming a magnetic circuit unit that is to allow a magnetic flux to pass therethrough;

support means for supporting the movable magnetic member to ensure that the movable magnetic member is movable along the axis of the magnetic housing to assume the first and second axial positions of the movable magnetic member;

biasing means for axially resiliently biasing the movable magnetic member toward the second axial position of the movable magnetic member;

a permanent magnet positioned in the housing chamber and radially between the magnetic housing and the movable magnetic member to generate a magnetic flux; and an electromagnetic coil positioned between the stationary magnetic member and the permanent magnet in the housing chamber in axial alignment with the stationary magnetic member and the permanent magnet to generate a magnetic flux with an electric current imparted thereto, the magnetic circuit unit partly having a diminished cross-sectional area being sized to ensure that the magnetic circuit unit is saturated with the magnetic flux as the movable magnetic member is positioned in the neighborhood of the first axial position of the movable magnetic member, the width of the magnetic flux gap being sized to ensure that the strength of the magnetic attraction between the stationary magnetic member and the movable magnetic member increases in response to the increased density of the magnetic flux flowing between the magnetic surface of the stationary magnetic member and the magnetic surface of the movable magnetic member with an increase rate increasing as the movable magnetic member is positioned in the neighborhood of the first axial position of the movable magnetic member, the diminished cross-sectional area of the magnetic circuit unit and the width of the magnetic flux gap being each sized to ensure that the strength of the magnetic attraction between the stationary magnetic member and the movable magnetic member substantially linearly increases in response to the increased level of the electric current imparted to the electromagnetic coil under the influence of each of the diminished cross-sectional area of the magnetic circuit unit and the width of the magnetic flux gap as the movable magnetic member is positioned in the neighborhood of the first axial position of the movable magnetic member.

2. An electromagnetic force motor as set forth in claim 1 in which each of the stationary magnetic member, the movable magnetic member, the permanent magnet, and the electromagnetic coil is in the form of an annular shape, and the magnetic housing, the stationary magnetic member, the movable magnetic member, the permanent magnet, and the electromagnetic coil are in axial alignment with each other.

3. An electromagnetic force motor as set forth in claim 2 in which the electromagnetic coil is composed of a plurality of coils, which are in electrically parallel relationship with each other.

4. An electromagnetic force motor as set forth in claim 2 in which the magnetic circuit unit has the diminished cross-sectional area in the magnetic housing.

5. An electromagnetic force motor as set forth in claim 2 in which the stationary magnetic member having an axial portion, the electromagnetic coil positioned radially outwardly of the axial portion of the stationary magnetic member.

6. An electromagnetic force motor as set forth in claim 2 in which the biasing means is composed of a disk spring with a plurality of holes spirally drilled therein and made of a steal.

7. An electromagnetic force motor as set forth in claim 2 further comprises a non-magnetic stopper in the form of an annular shape and made of a non-magnetic substance, the non-magnetic stopper positioned in the housing chamber in coaxial relationship with the magnetic housing, the first non-magnetic stopper positioned between the stationary magnetic member and the movable magnetic member to prevent the stationary magnetic member and the movable magnetic member from being adhered to each other.

8. An electromagnetic force motor as set forth in claim 2 further comprises a non-magnetic member in the form of an annular shape and made of a non-magnetic substance, the non-magnetic member positioned in the housing chamber in coaxial relationship with the magnetic housing, radially outwardly of the movable magnetic member, and radially inwardly of the permanent magnet and the electromagnetic coil, the magnetic housing, the stationary magnetic member, and the non-magnetic member collectively tightly enclosing the electromagnetic coil and the permanent magnet.

9. An electromagnetic force motor as set forth in claim 2 further comprises a movable rod made of a non-magnetic substance and integrally formed with the movable magnetic member in coaxial relationship with the magnetic housing.

10. An electromagnetic force motor comprising:

a magnetic housing made of a magnetic substance and having an axis, the magnetic housing being in the form of a cylindrical hollow shape to have a housing chamber formed therein;

first and second stationary magnetic members each made of a magnetic substance and each received in the housing chamber in stationary relationship with respect to the magnetic housing, the first and second stationary magnetic members each having a magnetic flux surface substantially perpendicularly extending to the axis of the magnetic housing to permit a magnetic flux to pass therethrough;

a movable magnetic member made of a magnetic substance and received in the housing chamber to be movable with respect to the magnetic housing along the axis of the magnetic housing to assume first, second, and third axial positions axially spaced apart from each other, the first axial position of the movable magnetic member being closer to the first stationary magnetic member than the third axial position of the movable magnetic member, the third axial position of the movable magnetic member being closer to the second stationary magnetic member than the first axial position of the movable magnetic member, the second axial position of the movable magnetic member being between the first and third axial positions of the movable magnetic member, the movable magnetic member having a first magnetic flux surface substantially perpendicularly extending to the axis of the magnetic housing to be held in face-to-face relationship with the magnetic flux surface of the first stationary magnetic member with a first magnetic flux gap to permit a magnetic flux to pass therethrough, the movable magnetic member having a second magnetic flux surface substantially perpendicularly extending to the axis of the magnetic housing to be held in face-to-face relationship with the magnetic flux surface of the second stationary magnetic member with a second magnetic flux gap to permit a magnetic flux to pass therethrough, the magnetic housing, the first and second stationary magnetic members, and the movable magnetic member collectively forming a magnetic circuit unit that is to allow a magnetic flux to pass therethrough;

support means for supporting the movable magnetic member to ensure that the movable magnetic member is movable along the axis of the magnetic housing to assume the first, second, and third axial positions of the movable magnetic member;

biasing means for axially resiliently biasing the movable magnetic member toward the second axial position of the movable magnetic member;

a permanent magnet positioned in the housing chamber and radially between the magnetic housing and the movable magnetic member to generate a magnetic flux;

a first electromagnetic coil positioned between the first stationary magnetic member and the permanent magnet in the housing chamber in axial alignment with the first stationary magnetic member and the permanent magnet to generate a magnetic flux with an electric current imparted thereto; and a second electromagnetic coil positioned between the second stationary magnetic member and the permanent magnet in the housing chamber in axial alignment with the second stationary magnetic member and the permanent magnet to generate a magnetic flux with an electric current imparted thereto, the magnetic circuit unit partly having a diminished cross-sectional area being sized to ensure that the magnetic circuit unit is saturated with the magnetic flux as the movable magnetic member is positioned in the neighborhood of the first and second axial positions of the movable magnetic member, the width of the first magnetic flux gap being sized to ensure that the strength of the magnetic attraction between the first stationary magnetic member and the movable magnetic member increases in response to the increased density of the magnetic flux flowing between the magnetic surface of the first stationary magnetic member and the first magnetic surface of the movable magnetic member with an increase rate increasing as the movable magnetic member is positioned in the neighborhood of the first axial position of the movable magnetic member, the diminished cross-sectional area of the magnetic circuit unit and the width of the first magnetic flux gap being each sized to ensure that the strength of the magnetic attraction between the first stationary magnetic member and the movable magnetic member substantially linearly increases in response to the increased level of the electric current imparted to at least one of the first and second electromagnetic coils and under the influence of each of the diminished cross-sectional area of the magnetic circuit unit and the width of the first magnetic flux gap as the movable magnetic member is positioned in the neighborhood of the first axial position of the movable magnetic member, the width of the second magnetic flux gap being sized to ensure that the strength of the magnetic attraction between the second stationary magnetic member and the movable magnetic member increases in response to the increased density of the magnetic flux flowing between the magnetic surface of the second stationary magnetic member and the second magnetic surface of the movable magnetic member with an increase rate increasing as the movable magnetic member is positioned in the neighborhood of the third axial position of the movable magnetic member.

the diminished cross-sectional area of the magnetic circuit unit and the width of the second magnetic flux gap being each sized to ensure that the strength of the magnetic attraction between the second stationary magnetic member and the movable magnetic member substantially linearly increases in response to the increased level of the electric current imparted to at least one of the first and second electromagnetic coils and under the influence of each of the diminished cross-sectional area of the magnetic circuit unit and the width of the second magnetic flux gap as the movable magnetic member is positioned in the neighborhood of the third axial position of the movable magnetic member.

11. An electromagnetic force motor as set forth in claim 10 in which each of the first and second stationary magnetic members, the movable magnetic member, the permanent magnet, and the first and second electromagnetic coils is in the form of an annular shape, and the magnetic housing, the first and second stationary magnetic members, the movable magnetic member, the permanent magnet, and the first and second electromagnetic coils are in axial alignment with each other.

12. An electromagnetic force motor as set forth in claim 11 in which the first and second electromagnetic coils are each composed of a plurality of coils, which are in electrically parallel relationship with each other.

13. An electromagnetic force motor as set forth in claim 11 in which the magnetic circuit unit has the diminished cross-sectional area in the magnetic housing.

14. An electromagnetic force motor as set forth in claim 11 in which the first and second stationary magnetic members each having an axial portion, the first and second electromagnetic coils respectively positioned radially outwardly of the axial portions of the first and second stationary magnetic members.

15. An electromagnetic force motor as set forth in claim 11 in which the biasing means is composed of a disk spring with a plurality of holes spirally drilled therein and made of a steal.

16. An electromagnetic force motor as set forth in claim 11 further comprises first and second non-magnetic stoppers in the form of an annular shape and made of a non-magnetic substance, the first and second non-magnetic stoppers each positioned in the housing chamber in coaxial relationship with the magnetic housing, the first non-magnetic stopper positioned between the first stationary magnetic member and the movable magnetic member to prevent the first stationary magnetic member and the movable magnetic member from being adhered to each other, the second non-magnetic stopper positioned between the second stationary magnetic member and the movable magnetic member to prevent the second stationary magnetic member and the movable magnetic member from being adhered to each other.

17. An electromagnetic force motor as set forth in claim 11 further comprises a non-magnetic member in the form of an annular shape and made of a non-magnetic substance, the non-magnetic member positioned in the housing chamber in coaxial relationship with the magnetic housing, radially outwardly of the movable magnetic member, and radially inwardly of the permanent magnet and the first and second electromagnetic coils, the magnetic housing, the first and second stationary magnetic members, and the non-magnetic member collectively tightly enclosing the first and second electromagnetic coils and the permanent magnet.

18. An electromagnetic force motor as set forth in claim 11 further comprises a movable rod made of a non-magnetic substance and integrally formed with the movable magnetic member in coaxial relationship with the magnetic housing.

19. A method of manufacturing an electromagnetic force motor comprising the steps of:

(a) preparing:

a magnetic housing made of a magnetic substance and having an axis, the magnetic housing being in the form of a cylindrical hollow shape to have a housing chamber formed therein;

a stationary magnetic member made of a magnetic substance and received in the housing chamber in stationary relationship with respect to the magnetic housing, the stationary magnetic member having a magnetic flux surface substantially perpendicularly extending to the axis of the magnetic housing to permit a magnetic flux to pass therethrough;

a movable magnetic member made of a magnetic substance and received in the housing chamber to be movable with respect to the magnetic housing along the axis of the magnetic housing to assume first and second axial positions axially spaced apart from each other, the first axial position of the movable magnetic member being closer to the stationary magnetic member than the second axial position of the movable magnetic member, the movable magnetic member having a magnetic flux surface substantially perpendicularly extending to the axis of the magnetic housing to be held in face-to-face relationship with the magnetic flux surface of the stationary magnetic member with a magnetic flux gap to permit a magnetic flux to pass therethrough, the magnetic housing, the stationary magnetic member, and the movable magnetic member collectively forming a magnetic circuit unit that is to allow a magnetic flux to pass therethrough;

support means for supporting the movable magnetic member to ensure that the movable magnetic member is movable along the axis of the magnetic housing to assume the first and second axial positions of the movable magnetic member;

biasing means for axially resiliently biasing the movable magnetic member toward the second axial position of the movable magnetic member;

a permanent magnet positioned in the housing chamber and radially between the magnetic housing and the movable magnetic member to generate a magnetic flux; and an electromagnetic coil positioned between the stationary magnetic member and the permanent magnet in the housing chamber in axial alignment with the stationary magnetic member and the permanent magnet to generate a magnetic flux with an electric current imparted thereto;

(b) adjusting the width of the magnetic flux gap to ensure that the strength of the magnetic attraction between the stationary magnetic member and the movable magnetic member increases in response to the increased density of the magnetic flux flowing between the magnetic surface of the stationary magnetic member and the magnetic surface of the movable magnetic member with an increase rate increasing as the movable magnetic member is positioned in the neighborhood of the first axial position of the movable magnetic member; and (c) adjusting the cross-sectional area of at least part of the magnetic circuit unit to ensure that the magnetic circuit unit is saturated with the magnetic flux, and the strength of the magnetic attraction between the stationary magnetic member and the movable magnetic member substantially linearly increases in response to the increased level of the electric current imparted to the electromagnetic coil under the influence of each of the diminished cross-sectional area of the magnetic circuit unit and the width of the magnetic flux gap, as the movable magnetic member is positioned in the neighborhood of the first axial position of the movable magnetic member.

20. A method of manufacturing an electromagnetic force motor comprising the steps of:

(a) preparing:

a magnetic housing made of a magnetic substance and having an axis, the magnetic housing being in the form of a cylindrical hollow shape to have a housing chamber formed therein;

a stationary magnetic member made of a magnetic substance and received in the housing chamber in stationary relationship with respect to the magnetic housing, the stationary magnetic member having a magnetic flux surface substantially perpendicularly extending to the axis of the magnetic housing to permit a magnetic flux to pass therethrough;

a movable magnetic member made of a magnetic substance and received in the housing chamber to be movable with respect to the magnetic housing along the axis of the magnetic housing to assume first and second axial positions axially spaced apart from each other, the first axial position of the movable magnetic member being closer to the stationary magnetic member than the second axial position of the movable magnetic member, the movable magnetic member having a magnetic flux surface substantially perpendicularly extending to the axis of the magnetic housing to be held in face-to-face relationship with the magnetic flux surface of the stationary magnetic member with a magnetic flux gap to permit a magnetic flux to pass therethrough, the magnetic housing, the stationary magnetic member, and the movable magnetic member collectively forming a magnetic circuit unit that is to allow a magnetic flux to pass therethrough;

support means for supporting the movable magnetic member to ensure that the movable magnetic member is movable along the axis of the magnetic housing to assume the first and second axial positions of the movable magnetic member;

biasing means for axially resiliently biasing the movable magnetic member toward the second axial position of the movable magnetic member;

a permanent magnet positioned in the housing chamber and radially between the magnetic housing and the movable magnetic member to generate a magnetic flux; and an electromagnetic coil positioned between the stationary magnetic member and the permanent magnet in the housing chamber in axial alignment with the stationary magnetic member and the permanent magnet to generate a magnetic flux with an electric current imparted thereto;

(b) adjusting the cross-sectional area of at least part of the magnetic circuit unit to ensure that the magnetic circuit unit is saturated with the magnetic flux as the movable magnetic member is positioned in the neighborhood of the first axial position of the movable magnetic member; and (c) adjusting the width of the magnetic flux gap to ensure that the strength of the magnetic attraction between the stationary magnetic member and the movable magnetic member increases in response to the increased density of the magnetic flux flowing between the magnetic surface of the stationary magnetic member and the magnetic surface of the movable magnetic member with an increase rate increasing, and the strength of the magnetic attraction between the stationary magnetic member and the movable magnetic member substantially linearly increases in response to the increased level of the electric current imparted to the electromagnetic coil under the influence of each of the diminished cross-sectional area of the magnetic circuit unit and the width of the magnetic flux gap, as the movable magnetic member is positioned in the neighborhood of the first axial position of the movable magnetic member.

* * * * *